(12) United States Patent
Okazaki et al.

(10) Patent No.: US 10,232,591 B2
(45) Date of Patent: Mar. 19, 2019

(54) HEAT INSULATING WINDOW FILM, HEAT INSULATING MATERIAL FOR WINDOW, AND WINDOW

(71) Applicant: FUJIFILM Corporation, Tokyo (JP)

(72) Inventors: Kentaro Okazaki, Fujinomiya (JP); Naoharu Kiyoto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 15/337,219

(22) Filed: Oct. 28, 2016

(65) Prior Publication Data

US 2017/0043556 A1    Feb. 16, 2017

Related U.S. Application Data

(63) Continuation of application No. PCT/JP2015/065557, filed on May 29, 2015.

(30) Foreign Application Priority Data

May 30, 2014  (JP) ................................. 2014-113111
May 29, 2015  (JP) ................................. 2015-109490

(51) Int. Cl.
  *B32B 17/06*  (2006.01)
  *B32B 7/12*   (2006.01)
  (Continued)

(52) U.S. Cl.
  CPC ............. *B32B 17/064* (2013.01); *B32B 5/16* (2013.01); *B32B 7/12* (2013.01); *B32B 27/36* (2013.01);
  (Continued)

(58) Field of Classification Search
  CPC .......... G02B 1/14; G02B 5/206; G02B 5/208; G02B 5/26; B05D 7/56; C09D 183/00;
  (Continued)

(56) References Cited

U.S. PATENT DOCUMENTS

2014/0069488 A1  3/2014  Tanaka et al.
2014/0148131 A1  5/2014  Kholaif et al.
(Continued)

FOREIGN PATENT DOCUMENTS

JP    2006-264167 A    10/2006
JP    2012-206430 A    10/2012
JP    2012-238579 A    12/2012

OTHER PUBLICATIONS

International Search Report for PCT/JP2015/065557 (PCT/ISA/210) dated Sep. 1, 2015 is attached herewith.
(Continued)

*Primary Examiner* — Camie S Thompson
(74) *Attorney, Agent, or Firm* — Birch, Stewart, Kolasch & Birch, LLP

(57) ABSTRACT

Provided is a heat insulating window film including a flexible support, and a fibrous metal particles-containing layer containing fibrous metal particles, in which the fibrous metal particles contain silver or an alloy of silver, an average short diameter of the fibrous metal particles is equal to or smaller than 35 nm and an average long diameter is equal to or greater than 5 μm, and a content per unit area of fibrous metal particles of the fibrous metal particles-containing layer is equal to or greater than 10 mg/m².

18 Claims, 3 Drawing Sheets

(51) Int. Cl.
*B32B 27/36* (2006.01)
*B32B 5/16* (2006.01)
*G02B 5/26* (2006.01)
*C03B 19/12* (2006.01)
*G02B 5/20* (2006.01)
*C09D 183/00* (2006.01)
*C08G 77/00* (2006.01)

(52) U.S. Cl.
CPC .............. *C03B 19/12* (2013.01); *C08G 77/00* (2013.01); *C09D 183/00* (2013.01); *G02B 5/206* (2013.01); *G02B 5/208* (2013.01); *G02B 5/26* (2013.01); *B32B 2255/10* (2013.01); *B32B 2255/20* (2013.01); *B32B 2262/103* (2013.01); *B32B 2264/105* (2013.01); *B32B 2307/304* (2013.01); *B32B 2307/412* (2013.01); *B32B 2307/42* (2013.01); *B32B 2307/732* (2013.01); *B32B 2419/00* (2013.01)

(58) Field of Classification Search
CPC .... C09D 5/24; C09D 5/32; C09D 7/70; B32B 2262/103; B32B 2264/105; B32B 2605/006; B32B 17/064; B32B 5/16; B32B 7/12; B32B 2255/10; B32B 2255/20; B32B 2307/304; B32B 2307/412; B32B 2307/42; B32B 2307/732; B32B 2419/00; H05K 2201/026; H05K 2201/0266; H01B 1/16; C03B 19/12; C08G 77/00
See application file for complete search history.

(56) References Cited

U.S. PATENT DOCUMENTS

| | | | |
|---|---|---|---|
| 2014/0262453 A1* | 9/2014 | Poon ........................ | H05K 3/12 174/253 |
| 2017/0052296 A1* | 2/2017 | Kiyoto ................... | B32B 27/18 |
| 2017/0136740 A1* | 5/2017 | Kiyoto ................... | B32B 17/10 |

OTHER PUBLICATIONS

Written Opinion of the International Searching Authority for PCT/JP2015/065557 (PCT/ISA/237) dated Sep. 1, 2015 is attached herewith.

English translation of Written Opinion of the International Search Authority for PCT/JP2015/065557 (PCT/ISA/237) dated Sep. 1, 2015.

Chinese Office Action and Search Report for corresponding Chinese Application No. 201580026528.9, dated Aug. 3, 2018, with an English translation of the Office Action.

\* cited by examiner

HEAT INSULATING WINDOW FILM, HEAT INSULATING MATERIAL FOR WINDOW, AND WINDOW

CROSS-REFERENCE TO RELATED APPLICATIONS

This application is a Continuation of PCT International Application No. PCT/JP2015/065557, filed on May 29, 2015, which claims priority under 35 U.S.C. Section 119(a) to Japanese Patent Application No. 2014-113111 filed on May 30, 2014 and Japanese Patent Application No. 2015-109490 filed on May 29, 2015. Each of the above applications is hereby expressly incorporated by reference, in its entirety, into the present application.

BACKGROUND OF THE INVENTION

1. Field of the Invention

The present invention relates to a heat insulating window film, a heat insulating material for a window, and a window. More specifically, the invention relates to a heat insulating window film, a heat insulating material for a window, and a window having excellent visible light transmittance and warming properties.

2. Description of the Related Art

In recent years, products with a lower environmental burden, which are so-called eco-friendly products have been required as one of energy saving measures for carbon dioxide reduction, and solar control window films for windows of vehicles or buildings have been required. A heat insulating window film is considered as such a product. The heat insulating window film is a film which delays transmission and reception of heat between an indoor side and an outdoor side by being attached to windows, and usage of heating is reduced by using this film, even in a case where a temperature on the outdoor side is lower than a temperature on the indoor side, and therefore, energy saving can be expected.

A degree of heat insulation is generally defined by using a coefficient of overall heat transmission and a small number means high heat insulating properties. According to JIS A 5759 (JIS stands for Japanese Industrial Standards), a coefficient of overall heat transmission can be acquired form reflection spectra of far infrared rays at a wavelength of 5 μm to 50 μm. When reflectivity of far infrared rays at a wavelength of 5 μm to 50 μm is increased, it is possible to decrease a coefficient of overall heat transmission, and thus, it is preferable to increase reflectivity of far infrared rays at a wavelength of 5 μm to 50 μm, in order to increase heat insulating properties.

Various configurations are known as methods of increasing reflectivity of infrared rays.

JP2006-264167A discloses that a layer reflecting infrared rays can be prepared by interposing a metal layer between two dielectric layers.

JP2006-264167A discloses a transparent heat shielding film formed of a surface protective layer, a primer layer, a heat shielding layer, and a base material and in which the heat shielding layer is formed by using a conductive polymer such as polyaniline.

JP2012-206430A discloses a laminated film in which a metal layer using silver as a main component and having a multi-layered structure including a far infrared reflection layer and a dielectric layer/carbon layer/hard coat layer are formed in this order on one surface of a base material formed of a synthesis resin, and an ultraviolet cutting layer is formed on the other surface of the base material.

Meanwhile, fibrous metal particles (for example, silver nanowires) or other fibrous conductive particles (carbon nanotubes and the like) are known as a material of a transparent electrode pattern in a touch panel field.

JP2012-238579A discloses a conductive member which includes a conductive layer containing conductive fibers using silver as a main component and having a short axis diameter equal to or smaller than 150 nm and three-dimensional cross-linking bond containing a bond represented by -M1-O-M1- (M1 represents an element selected from the group consisting of Si, Ti, Zr, and Al), on a base material and includes at least one interlayer between the base material and the conductive layer.

However, heat insulating properties of a layer using fibrous metal particles has not been concerned.

SUMMARY OF THE INVENTION

Here, in a case where the usage of a heat insulating window film for windows of vehicles or buildings is considered, high visible light transmittance is preferable.

In a case where the usage of a heat insulating window film for windows of vehicles or buildings is considered, it is difficult to evaluate the heat insulating properties by only a coefficient of overall heat transmission or reflection or absorption of far infrared rays. In order to decrease the usage of heating when a person stays in a vehicle or a room of a building provided with windows, in a case where a temperature on an outdoor side is lower than that on an indoor side, it is important that a person staying on the indoor side sensuously feels warm due to the body temperature or heat radiated from a heater installed on the indoor side (hereinafter, referred to as warming properties).

The inventors investigated visible light transmittance and warming properties of materials disclosed in the documents in consideration of these circumstances.

When the inventors investigated properties of a layer reflecting infrared rays obtained by sandwiching a metal layer (metal thin film obtained by sputter vapor deposition) disclosed in H. A. Macleod. Thin-Film Optical Filters, The Nikkan Kogyo Shimbun, 1989, p 599-602 with two dielectric layers, it was found that it was difficult to manufacture a layer having high visible light transmittance.

The conductive polymer disclosed in JP2006-264167A absorbs near infrared rays (700 nm to 2500 nm) relating to heat shielding properties, but JP2006-264167A does not disclose properties of reflecting far infrared rays (equal to or greater than 4000 nm) relating to heat insulating properties. As a result of the investigation of the inventors, it was found that, when the conductive polymer material disclosed in JP2006-264167A was used, a near infrared shielding material having high transparency was obtained, but heat insulating properties for far infrared rays were not substantially obtained. In practice, when warming properties on an indoor side where a film was attached by using the conductive polymer disclosed in JP2006-264167A were investigated, in a case where a large amount of the conductive polymer was applied so as to decrease visible light transmittance to such an extent that was not suitable for windows, warming properties were finally increased. Therefore, it was found that it was difficult for the conductive polymer to realize compatible visible light transmittance and warming properties and, thus, the conductive polymer is not always excellent as a heat insulating material having high transparency.

In addition, JP2006-264167A does not disclose a method of using a conductive material other than an organic material such as a conductive polymer, as a heat shielding layer.

A laminated film disclosed in JP2012-206430A is described as an agricultural laminated film. JP2012-206430A discloses that it is necessary for an agricultural film used for greenhouse culture of a greenhouse for agriculture to reflect far infrared rays which becomes heat for room heating and increase heating efficiency, in order to efficiently absorb sunlight (particularly, visible light) necessary for growth of plants and cause a decrease in heating cost covering a large proportion of cultivation cost in cultivation in a greenhouse. JP2012-206430A considering growth of plants does not disclose investigation regarding a decrease in usage of heating when a person stays in a vehicle or a room of a building provided with windows, in a case where a temperature on an outdoor side is lower than that on an indoor side. Thus, a person skilled in the art who has read JP2012-206430A may not easily increase heat insulating properties (warming properties) in an extent that a person staying on the indoor side sensuously feels warm due to the body temperature or heat radiated from a heater installed on the indoor side, and light visible transmittance to a comfortable range for the person, that is, may not easily divert the agricultural film to a film "for windows".

JP2012-206430A does not disclose a technology of bonding the obtained laminated film to windows of vehicles or buildings (for example, a substrate formed such as glass or a resin plate).

A conducive layer containing conductive fibers using silver as a main component on a base material disclosed in JP2012-238579A is described as a material of a transparent electrode pattern in a touch panel field and JP2012-238579A discloses application to a touch panel or a solar battery. However, JP2012-238579A does not disclose application to windows of vehicles or buildings or heat insulating properties.

According to page 43, lines 4 to 6 in JP2012-206430A, a transparent conductive film using Ag nanowires or carbon nanotubes has been developed, but it was disclosed that reflection of infrared rays is not sufficient. Accordingly, heat insulating properties of a layer using fibrous metal particles have not been investigated in the related art, and according to JP2012-206430A and JP2012-238579A, it was found that application of the layer using fibrous metal particles to a heat insulating material was not expected from a viewpoint of heat insulating properties.

As described above, a heat insulating window film having excellent visible light transmittance and warming properties has not been known yet.

An object of the invention is to provide a heat insulating window film having excellent visible light transmittance and warming properties.

As a result of intensive studies, the inventors have newly found that a fibrous metal particles-containing layer obtained to have a content per unit area of fibrous metal particles to be in a specified range by using fibrous metal particles having a long diameter and a short diameter in specified ranges and containing silver, has far infrared shielding properties which were not known in the related art, and has high visible light transmittance, and therefore, warming properties are improved further than that of the conductive polymer disclosed in JP2006-264167A.

That is, the above-mentioned problems are solved with the invention having the following configurations.

[1] A heat insulating window film comprising:
a flexible support; and
a fibrous metal particles-containing layer containing fibrous metal particles,
in which the fibrous metal particles contain silver or an alloy of silver,
an average short diameter of the fibrous metal particles is equal to or smaller than 35 nm and an average long diameter is equal to or greater than 5 μm, and
a content per unit area of fibrous metal particles of the fibrous metal particles-containing layer is equal to or greater than 10 mg/m$^2$.

[2] The heat insulating window film according to [1],
in which the fibrous metal particles-containing layer further contains a sol-gel hardened material obtained by hydrolysis and polycondensation of an alkoxide compound of an element (b) selected from the group consisting of Si, Ti, Zr, and Al.

[3] The heat insulating window film according to [2],
in which a ratio of a mass of the alkoxide compound used for forming the sol-gel hardened material in the fibrous metal particles-containing layer to a mass of fibrous metal particles contained in the fibrous metal particles-containing layer is from 0.25/1 to 30/1.

[4] The heat insulating window film according to any one of [1] to [3], which is disposed on an indoor side of a window.

[5] The heat insulating window film according to [4],
in which the fibrous metal particles-containing layer is disposed on the surface of the support on a side opposite to the surface on a window side.

[6] The heat insulating window film according to any one of [1] to [5],
in which visible light transmittance is equal to or greater than 80%.

[7] The heat insulating window film according to any one of [1] to [6],
in which a number proportion of fibrous metal particles having a long diameter equal to or greater than 15 μm contained in the fibrous metal particles-containing layer is equal to or smaller than 20%.

[8] A heat insulating material for a window,
in which the heat insulating window film according to any one of [1] to [7] and a substrate having a thickness equal to or greater than 0.5 mm are bonded to each other by using a pressure sensitive adhesive material.

[9] The heat insulating material for a window according to [8],
in which the pressure sensitive adhesive material contains an ultraviolet absorber.

[10] A heat insulating material for a window, comprising:
a substrate having a thickness equal to or greater than 0.5 mm; and
a fibrous metal particles-containing layer containing fibrous metal particles,
in which the fibrous metal particles contain silver or an alloy of silver,
an average short diameter of the fibrous metal particles is equal to or smaller than 35 nm and an average long diameter is equal to or greater than 5 μm, and
a content per unit area of fibrous metal particles of the fibrous metal particles-containing layer is equal to or greater than 10 mg/m$^2$.

[11] The heat insulating material for a window according to [10],
in which the fibrous metal particles-containing layer further contains a sol-gel hardened material obtained by hydrolysis and polycondensation of an alkoxide compound of an element (b) selected from the group consisting of Si, Ti, Zr, and Al.

[12] The heat insulating material for a window according to [11], in which a ratio of a mass of the alkoxide compound used for forming the sol-gel hardened material in the fibrous metal particles-containing layer to a mass of fibrous metal particles contained in the fibrous metal particles-containing layer is from 0.25/1 to 30/1.

[13] The heat insulating material for a window according to any one of [10] to [12], in which the fibrous metal particles-containing layer is disposed on an indoor side of a window.

[14] The heat insulating material for a window according to [13], in which the fibrous metal particles-containing layer is disposed on the surface of the substrate on a side opposite to a surface on a window side.

[15] The heat insulating material for a window according to any one of [8] to [14], in which the substrate is glass or a resin plate.

[16] The heat insulating material for a window according to any one of [8] to [15], in which the substrate is a substrate having a thickness equal to or greater than 2 mm.

[17] The heat insulating material for a window according to any one of [8] to [16], in which a shade factor is equal to or greater than 0.8.

[18] The heat insulating material for a window according to any one of [8] to [17], in which a number proportion of fibrous metal particles having a long diameter equal to or greater than 15 μm contained in the fibrous metal particles-containing layer is equal to or smaller than 20%.

[19] A window comprising:

a window glass and the heat insulating window film according to any one of [1] to [7] bonded to the window glass; or the heat insulating material for a window according to any one of [8] to [18].

According to the invention, it is possible to provide a heat insulating window film having excellent visible light transmittance and warming properties.

DESCRIPTION OF THE PREFERRED EMBODIMENTS

Figure 1:
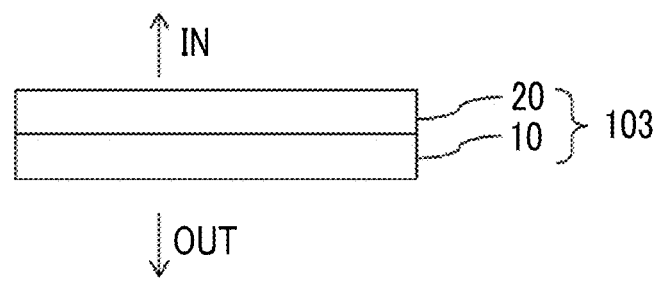
FIG. 1 is a schematic view showing a cross section of an example of a heat insulating window film of the invention.

Hereinafter, the invention will be described in detail. The description of the following constituent elements is based on representative embodiments and specific examples, but the invention is not limited to such embodiments. In this specification, a number range expressed using "to" means a range including the numerical numbers before and after the term "to" as a lower limit value and an upper limit value.

[Heat Insulating Window Film]

A heat insulating window film of the invention includes a flexible support, and a fibrous metal particles-containing layer containing fibrous metal particles, the fibrous metal particles contain silver or an alloy of silver, an average short diameter of the fibrous metal particles is equal to or smaller than 35 nm and an average long diameter thereof is equal to or greater than 5 μm, and a content per unit area of fibrous metal particles of the fibrous metal particles-containing layer is equal to or greater than 10 mg/m$^2$.

With such a configuration, it is possible to provide a heat insulating window film having excellent visible light transmittance and warming properties.

It is possible to prevent radiation of heat to the outside the window by reflecting far infrared rays corresponding to a temperature of a heat source used for room heating (referred to as heat insulating).

As a material reflecting far infrared rays, a material having high free electron density such as metal is known.

Transparency is required for a material for windows, and accordingly, among metals, it is general to use a thin film which can transmit visible light, but light transmittance and far infrared reflectiveness have a trade-off relationship.

Meanwhile, ITO known as a transparent conductive material or a conductive polymer also reflects far infrared rays, but reflectivity is not sufficient due to low free electron density.

The fibrous metal particles have high free electron density which is unique properties of metal and transmit visible light by thinning a short diameter of fibers. Accordingly, the fibrous metal particles thinned to a nano range show ideal properties as a far infrared reflective material for a window used in a heat insulating window film or a heat insulating material for a window.

Since the fibrous metal particles contain silver or an alloy of silver, it is possible to increase warming properties than that of a conductive polymer such as polyaniline disclosed in JP2006-264167A. When the fibrous metal particles has an average short diameter (same meaning as average short axis length or an average diameter) equal to or smaller than 35 nm, it is possible to increase warming properties. When the fibrous metal particles has an average long diameter (same meaning as average long axis length) equal to or greater than 5 μm, it is possible to reflect far infrared rays at a wavelength of 5 μm to 50 μm, sufficient heat insulating properties are easily obtained, and accordingly, warming properties can be increased. When a content per unit area of the fibrous metal particles of the fibrous metal particles-containing layer is equal to or greater than 10 mg/m$^2$, it is possible to increase warming properties. Such a fibrous metal particles-containing layer also has higher visible light transmittance, compared to that of a sputtering-metal laminated body.

In the preferred aspect of the heat insulating window film of the invention, it is preferable that the fibrous metal particles-containing layer is disposed on a surface of a support on a side opposite to a surface on a window side (more preferable that fibrous metal particles-containing layer is used as the outermost layer on the outdoor side as possible), because it is possible to reflect far infrared rays. When the heat insulating window film is not disposed on a window, far infrared rays in a room are adsorbed onto glass or a resin plate and the indoor heat escapes to the outside of the room due to heat conduction in a window of the glass or the resin plate, but when the heat insulating window film is provided, far infrared rays are reflected in the room, and accordingly, the indoor heat hardly escapes to the outside of the room.

The heat insulating window film of the invention can be manufactured by application of the fibrous metal particles-containing layer, and accordingly, the manufacturing cost thereof is low and an area of the film is easily enlarged, compared to a case of a sputtering-metal laminated body.

Hereinafter, the preferred aspect of the heat insulating window film of the invention will be described.

<Properties>

The heat insulating window film of the invention has excellent visible light transmittance and warming properties.

Optical properties of the heat insulating window film of the invention are measured in a state of being attached to glass by using a pressure sensitive adhesive material. A pressure sensitive adhesive material is bonded to the heat insulating window film by using the following method to form a pressure sensitive adhesive layer. PANACLEAN PD-S1 (pressure sensitive adhesive layer having a thickness of 25 μm) manufactured by PANAC Corporation is used as the pressure sensitive adhesive material, a peelable separator (silicone coat PET) of the pressure sensitive adhesive material is peeled off, and the pressure sensitive adhesive material is bonded to the surface of the flexible support on a side opposite to the fibrous conductive particles-containing layer. The other heavy peelable separator (silicone coat PET) of the pressure sensitive adhesive material PD-S1 is peeled off from the pressure sensitive adhesive layer formed by the method described above, the pressure sensitive adhesive layer is bonded to a plate glass (thickness of plate glass: blue plate glass having a thickness of 3 mm) which is soda-lime silicate by using a 0.5 mass % diluent of REAL PERFECT (manufactured by Lintec Corporation) which is film processing liquid, and a measurement sample for optical properties is prepared.

A preferred range of visible light transmittance is the same as a preferred range described in examples which will be described later. In the heat insulating window film of the invention which is the measurement sample for optical properties, it is practically required that visible light transmittance exceeds 75%, and the visible light transmittance is preferably equal to or greater than 80%.

Measurement of haze of the heat insulating window film of the invention which is the measurement sample for optical properties is performed based on JIS-K-7105. The haze of the heat insulating window film of the invention which is the measurement sample for optical properties is preferably equal to or smaller than 5%, more preferably equal to or smaller than 2%, particularly preferably equal to or smaller than 1.8%, and most preferably equal to or smaller than 1.6%.

In the invention, chromaticity a* value and b* value are values obtained by measurement performed by using a method based on JIS-Z8729: 1994. A measurement method based on JIS-Z8729 is a measurement method performed by transmission and a measurement method performed by reflection. Regarding the chromaticity of the heat insulating window film of the invention, in transmission chromaticity, the a* value is preferably from −10 to +5, more preferably from −5 to 3, and most preferably from −1 to 1. The b* value is preferably from −10 to +5, more preferably −5 to 3, and most preferably from −1 to 1. Meanwhile, in reflection chromaticity, the a* value is preferably from −5 to 10, more preferably from −3 to 5, and most preferably from −1 to 1. The b* value is preferably from −5 to 10, more preferably −3 to 5, and most preferably from −1 to 1.

<Configuration>

The configuration of the heat insulating window film of the invention will be described.

Figure 2:
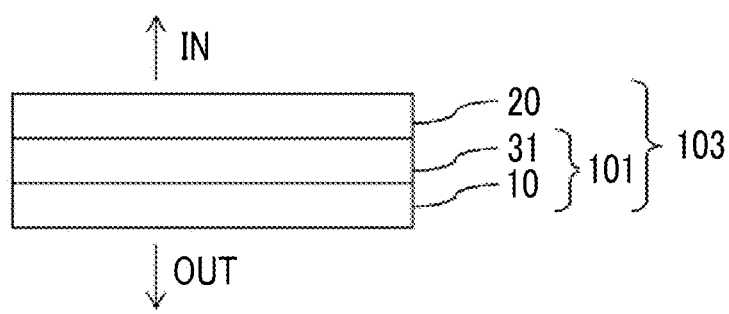
FIG. 2 is a schematic view showing a cross section of another example of the heat insulating window film of the invention.
Figure 3:
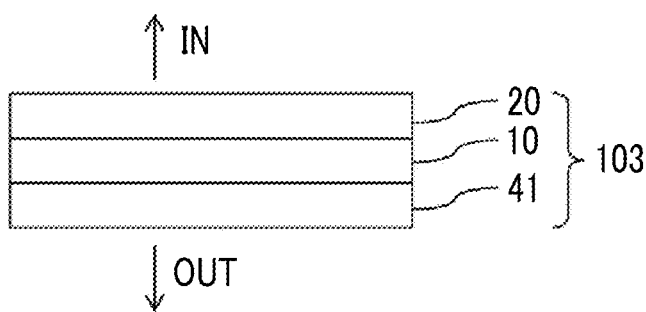
FIG. 3 is a schematic view showing a cross section of another example of the heat insulating window film of the invention.

FIGS. 1 to 3 showed schematic views showing cross sections of examples of the heat insulating window film of the invention.

A heat insulating window film 103 of the invention disclosed in FIG. 1 includes a flexible support 10, and a fibrous metal particles-containing layer 20 disposed on the flexible support 10.

It is preferable that the heat insulating window film 103 of the invention is disposed on an indoor side of a window (inner side, side opposite to a sunlight incident side during daytime, IN side in FIG. 1) disclosed on an OUT side in FIG. 1 (window is not shown in FIG. 1).

It is preferable that the fibrous metal particles-containing layer 20 is disposed on a surface of the flexible support 10 on a side opposite to a surface on a window side (OUT side in FIG. 1). In the invention, it is preferable that the fibrous metal particles-containing layer 20 is the outermost layer or the second outermost layer on the indoor side, from a viewpoint of increasing warming properties, and it is more preferable that the fibrous metal particles-containing layer is the outermost layer on the indoor side. Here, regarding the bonding of infrared shielding material to a substrate, JP2006-264167A does not disclose bonding of infrared shielding material to any one of an indoor side and an outdoor side of a window or bonding of infrared shielding material to any one of a window side and an indoor side of glass or a resin plate of a conductive polymer material-coated surface.

The flexible support 10 and the fibrous metal particles-containing layer 20 may be laminated by coming into contact with each other, or the flexible support 10 and the fibrous metal particles-containing layer 20 may be bonded to each other through an adhesive layer 31 as shown in FIG. 2. The adhesive layer 31 may be a single layer or may be a laminated body of two or more layers. In addition, a laminated body obtained by providing the adhesive layer 31 on the flexible support 10 may be referred to as an adhesive layer-attached flexible support 101.

The heat insulating window film 103 of the invention may contain a near infrared shielding material. FIG. 3 showed an aspect where the heat insulating window film 103 of the invention includes a near infrared shielding layer 41 containing a near infrared shielding material. The near infrared shielding material may be included in other layers, without independently forming the near infrared shielding layer 41. The near infrared shielding material, for example, may be included in the fibrous metal particles-containing layer 20 or may be included in the adhesive layer 31. The near infrared shielding material may be included in a pressure sensitive adhesive layer (not shown in FIGS. 1 to 3) which may be arbitrarily provided in an outer portion of the heat insulating window film 103 of the invention. It is preferable that the near infrared shielding material is included in a layer on a surface side of the flexible support 10 on a window side (OUT side in FIG. 1), from a viewpoint of shielding near infrared rays.

Hereinafter, the preferred aspect of each layer configuring the heat insulating window film of the invention will be described.

<Flexible Support>

Various elements can be used as the flexible support described above according to the purpose, as long as it can shoulder the fibrous metal particles-containing layer. Generally, a plate-shaped or a sheet-shaped material is used.

The support may be transparent or may be opaque. Examples of a material configuring the flexible support include a synthetic resin such as polycarbonate, polyether sulfone, polyester, an acrylic resin, a vinyl chloride resin, an aromatic polyamide resin, polyamideimide, or polyimide. The surface of the flexible support where the fibrous metal particles-containing layer is formed may be previously treated by purification treatment using an alkaline aqueous solution, chemical treatment using a silane coupling agent, plasma treatment, ion plating, sputtering, a gas phase reaction method, and vacuum evaporation, if desired.

A thickness of the flexible support is in a desired range according to the purpose. In general, the thickness thereof is selected from a range of 1 μm to 500 μm, is more preferably from 3 μm to 400 μm, and even more preferably from 5 μm to 300 μm.

Visible light transmittance of the flexible support is preferably greater than 75%, more preferably equal to or greater than 85%, and even more preferably equal to or greater than 90%. The visible light transmittance of the flexible support is measured based on ISO 13468-1 (1996) (International Organization for Standardization: ISO).

<Fibrous Metal Particles-Containing Layer>

The fibrous metal particles-containing layer contains fibrous metal particles, and a content per unit area of the fibrous metal particles of the fibrous metal particles-containing layer is equal to or greater than 10 mg/m².

Figure 7:
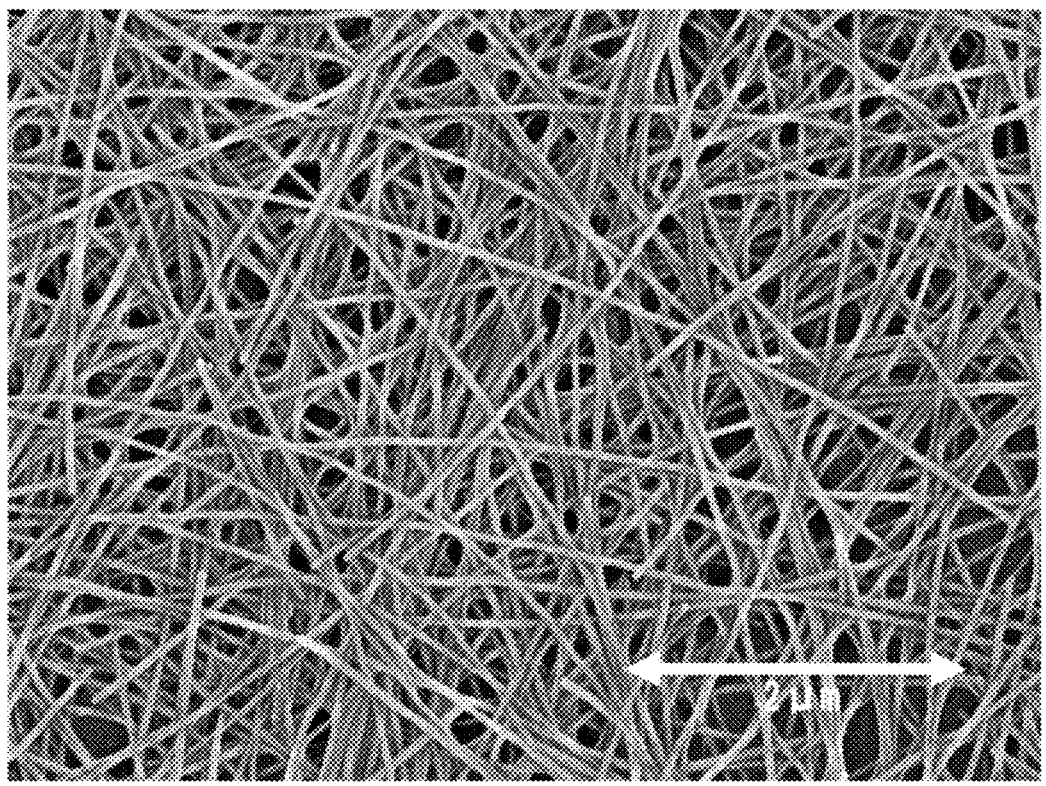
FIG. 7 is an electron micrograph showing a state of arrangement of fibrous metal particles.

FIG. 7 showed a microphotograph of a representative example of the fibrous metal particles-containing layer. The fibrous metal particles-containing layer preferably has a structure shown in FIG. 7. For example, a void size thereof is preferably small, in order to reflect far infrared rays. In a cross section of the fibrous metal particles-containing layer, for example, 80% or more voids more preferably have a void area of 25 (μm)² or less.

(Anisotropy of Surface Electrical Resistance of Fibrous Metal Particles-containing Layer)

In the invention, it is preferable that arrangement of fibrous metal particles is disordered. When the fibrous metal particles reflect far infrared rays, efficiency of reflection may be increased with an interaction of a direction of fibrous metal particles and far infrared polarization. A polarization direction of far infrared rays radiated from a typical heat source such as an electric heater is not constant, and in order to increase efficiency of reflection, it is preferable that the fibrous metal particles are arranged in a disordered direction in the same manner as the polarization of far infrared rays. The degree of arrangement of the fibrous metal particles can be quantified with anisotropy of surface electrical resistance of the fibrous metal particles-containing layer. In a case where the anisotropy of the surface electrical resistance is shown with a percentage of an absolute value of a difference between surface electrical resistance in an arbitrary direction measured with four probes obtained by arranging probes in a straight line and surface electrical resistance in a direction orthogonal thereto, the anisotropy thereof is preferably equal to or smaller than 25%, more preferably equal to or smaller than 15%, and most preferably equal to or smaller than 10% in the invention. The anisotropy of the surface electrical resistance is preferably equal to or smaller than 25%, because warming properties are significantly improved which is considered to be due to easiness of prevention of leakage of far infrared rays having the anisotropy thereof.

(Fibrous Metal Particles)

The fibrous metal particles contains silver or an alloy of silver, and an average short diameter of the fibrous metal particles is equal to or smaller than 35 nm and an average long diameter thereof is equal to or greater than 5 μm.

The fibrous metal particles have a fibrous shape and the fibrous shape has the same meaning as a wire shape or a liner shape.

The fibrous metal particles preferably have conductivity.

As the fibrous metal particles, metal nanowires or rod-shaped metal particles can be used. Metal nanowires are preferable as the fibrous metal particles. Hereinafter, the metal nanowires will be described as a representative example of the fibrous metal particles, but the description of the metal nanowires can be used as general description of the fibrous metal particles.

In the fibrous metal particles-containing layer, the fibrous metal particles such as metal nanowires preferably have a solid structure.

—Average Short Diameter—

In order to easily form more transparent fibrous metal particles-containing layer, the fibrous metal particles such as metal nanowires, for example, preferably have an average short diameter of 1 nm to 35 nm.

The average short diameter of the fibrous metal particles is equal to or smaller than 35 nm, preferably equal to or smaller than 30 nm, and more preferably equal to or smaller than 25 nm, from a viewpoint of warming properties and a viewpoint of obtaining more excellent properties with respect to haze. When the average short diameter is equal to or greater than 1 nm, a fibrous metal particles-containing layer having excellent oxidation resistance and excellent weather resistance is easily obtained. The average short diameter thereof is more preferably equal to or greater than 5 nm, even more preferably equal to or greater than 10 nm, and particularly preferably equal to or greater than 15 nm.

The average short diameter of the fibrous metal particles such as metal nanowires is preferably from 1 nm to 35 nm, more preferably from 5 nm to 35 nm, particularly preferably from 10 nm to 35 nm, more particularly preferably from 15 nm to 30 nm, and even more particularly preferably from 15 nm to 25 nm, from viewpoints of a haze value, oxidation resistance, and weather resistance.

—Average Long Diameter—

The average long diameter of the fibrous metal particles such as metal nanowires is preferably from 5 μm to 50 μm, more preferably from 5 μm to 40 m, particularly preferably from 5 μm to 30 μm, and more particularly preferably from 5 μm to 15 μm. When the average long diameter of the fibrous metal particles such as metal nanowires is equal to or smaller than 50 μm, synthesis of metal nanowires is easily performed without generating aggregates, and when the average long diameter thereof is equal to or greater than 5 μm, sufficient warming properties are easily obtained.

The average short diameter (average diameter) and the average long diameter of the fibrous metal particles such as metal nanowires can be acquired by observing a transmission electron microscope (TEM) image or an optical microscope image by using a TEM and an optical microscope, for example. Specifically, regarding the average short diameter (average diameter) and the average long diameter of the fibrous metal particles such as metal nanowires, short diameters and long diameters of 300 metal nanowires randomly selected are measured by using a transmission electron microscope (JEOL, Ltd., product name: JEM-2000FX) and the average short diameter and the average long diameter of fibrous metal particles such as metal nanowires can be acquired from the average values thereof. In this specification, the values obtained by using this method are used. Regarding the short diameter in a case where a cross section of the metal nanowires in a short axis direction does not have a circular shape, a length of the longest portion obtained by measuring a length in a short axis direction is set as the short diameter. In addition, in a case where the fibrous metal particles such as metal nanowires are curved, a circle having the curved shape as an arc is considered, and a value calculated from the radius thereof and curvature is set as the long diameter.

—Size Distribution—

In the embodiment, a content of fibrous metal particles having a short diameter (diameter) equal to or smaller than 35 nm and a long diameter equal to or greater than 5 μm with respect to a content of the entire fibrous metal particles of the fibrous metal particles-containing layer is preferably equal to or greater than 50% by mass, more preferably equal to or greater than 60% by mass, and even more preferably equal to or greater than 75% by mass, in terms of the metal amount.

It is preferable that a rate of the fibrous metal particles such as metal nanowires having a short diameter (diameter) equal to or smaller than 35 nm and a long diameter equal to or greater than 5 μm is equal to or greater than 50% by mass, because a percentage of metal nanowires which easily reflect far infrared rays at a wavelength of 5 μm to 50 μm is increased. In a configuration in which metal particles other than the fibrous metal particles are not substantially included in the fibrous metal particles-containing layer, a decrease in transparency can be avoided, even in a case of strong plasmon absorption.

A number proportion of fibrous metal particles having a long diameter equal to or greater than 15 μm contained in the fibrous metal particles-containing layer is preferably low, from a viewpoint of reducing haze, and specifically, the number proportion thereof is preferably equal to or smaller than 30%, more preferably equal to or smaller than 20%, particularly preferably equal to or smaller than 15%, and more particularly preferably equal to or smaller than 10%. The number of fibrous metal particles having a long diameter equal to or greater than 15 μm among 300 fibrous metal particles, the long diameters of which are measured, in the measurement method of the average long diameter, is counted and the number proportion of the particles having a long diameter equal to or greater than 15 μm is acquired.

A coefficient of variation of the short diameter (diameter) of the fibrous metal particles such as metal nanowires used in the fibrous metal particles-containing layer is preferably equal to or smaller than 40%, more preferably equal to or smaller than 35%, and even more preferably equal to or smaller than 30%.

The coefficient of variation is preferably equal to or smaller than 40%, from a viewpoint of transparency.

The coefficient of variation of the short diameter (diameter) of the fibrous metal particles such as metal nanowires can be acquired by measuring short diameter (diameter) of 300 nanowires randomly selected from a transmission electron microscope (TEM), for example, calculating a standard deviation and an arithmetic mean value thereof, and dividing the standard deviation by the arithmetic mean value.

—Aspect Ratio of Fibrous Metal Particles—

An aspect ratio of the fibrous metal particles such as metal nanowires used in the invention is preferably equal to or greater than 10. Here, the aspect ratio means a ratio of the average long diameter to the average short diameter (average long diameter/average short diameter). The aspect ratio can be calculated from the average long diameter and the average short diameter calculated by using the method described above.

The aspect ratio of the fibrous metal particles such as metal nanowires is not particularly limited, as long as it is equal to or greater than 10. The aspect ratio thereof can be suitably selected according to the purpose, and is preferably from 10 to 100,000, more preferably from 50 to 100,000, and even more preferably from 100 to 100,000.

When the aspect ratio is equal to or greater than 10, a network in which the fibrous metal particles such as metal nanowires are in contact with each other is easily formed, and a fibrous metal particles-containing layer having high warming properties is easily obtained. When the aspect ratio is equal to or smaller than 100,000, formation of aggregates due to a tangle of the fibrous metal particles such as metal nanowires in a coating solution used when providing the fibrous metal particles-containing layer on the support by coating, for example, and a stable coating solution is obtained, and accordingly, the fibrous metal particles-containing layer is easily manufactured.

The content of the fibrous metal particles such as metal nanowires having an aspect ratio equal to or greater than 10 with respect to the mass of the entire fibrous metal particles contained in the fibrous metal particles-containing layer is not particularly limited. The content is, for example, preferably equal to or greater than 70% by mass, more preferably equal to or greater than 75% by mass, and most preferably equal to or greater than 80% by mass.

A shape of the fibrous metal particles such as metal nanowires may be arbitrary shapes such as a cylindrical shape, a rectangular parallelepiped shape, or a columnar shape having a polygonal cross section. When a high transparency is necessary, a cylindrical shape or a polygonal shape having a pentagonal or more polygonal cross section and having a cross sectional shape without a sharp-pointed angle is preferable.

The cross sectional shape of the fibrous metal particles such as metal nanowires can be detected by applying a fibrous metal particles aqueous dispersion liquid such as metal nanowires on a support and observing a cross section with a transmission electron microscope (TEM).

—Metal—

The metal for forming the fibrous metal particles such as metal nanowires contains silver or an alloy of silver.

As the metal for forming the fibrous metal particles, a combination of two or more kinds of metal may be used and an alloy thereof can be used, in addition to one kind of metal. Among these, the metal is preferably formed of silver alone or a silver compound, and the metal is more preferably formed of silver alone.

Specific examples of metal include silver or an alloy including silver and one kind of metal among copper, gold, platinum, palladium, nickel, tin, cobalt, rhodium, iridium, iron, ruthenium, osmium, manganese, molybdenum, tungsten, niobium, tantalum, titanium, bismuth, antimony, and lead. Among these, silver or copper, gold, platinum, palladium, nickel, tin, cobalt, rhodium, iridium, or an alloy thereof is preferable, an alloy including silver and one kind of metal of palladium, copper, silver, gold, platinum, and tin is more preferable, and silver or an alloy of silver (that is, alloy including silver) is particularly preferable. Here, a content of silver of the alloy including silver is preferably equal to or greater than 50 mol %, more preferably equal to or greater than 60 mol %, and even more preferably equal to or greater than 80 mol % with respect to the entire amount of the alloy.

The fibrous metal particles such as metal nanowires contained in the fibrous metal particles-containing layer preferably contains silver nanowires, from a viewpoint of realizing high warming properties. It is more preferable to include silver nanowires having an average short diameter equal to or smaller than 35 nm and an average long diameter equal to or greater than 5 μm and even more preferable to include silver nanowires having an average short diameter of 5 nm to 30 nm and an average long diameter of 5 μm to 30 μm. The content of silver nanowires with respect to the mass of the entire fibrous metal particles contained in the fibrous metal particles-containing layer is not particularly limited, as long as it does not disturb the effects of the invention. The content of silver nanowires with respect to the mass of the entire fibrous metal particles contained in the fibrous metal particles-containing layer is, for example, preferably equal to or greater than 50% by mass and more preferably equal to or greater than 80% by mass, and it is even more preferable that the entire fibrous metal particles are substantially silver nanowires. Here, the term "substantially" means that inevitably mixed metal atoms other than silver are accepted.

—Content—

In the heat insulating window film of the invention, the content per unit area of the fibrous metal particles of the fibrous metal particles-containing layer is equal to or greater than 10 mg/m².

The content of the fibrous metal particles such as metal nanowires contained in the fibrous metal particles-containing layer is preferably set as an amount so that visible light transmittance (more preferably, properties with respect to haze) of the fibrous metal particles-containing layer is in a desired range, in accordance of the type of the fibrous metal particles such as metal nanowires. In the inventions, since the fibrous metal particles contain silver or an alloy of silver, the content per unit area of the fibrous metal particles of the fibrous metal particles-containing layer (content of fibrous metal particles such as metal nanowires per 1 m² of the fibrous metal particles-containing layer) is preferably in a range of 10 to 500 mg/m², more preferably in a range of 20 to 200 mg/m², particularly preferably in a range of 20 to 100 mg/m², more particularly preferably in a range of 20 to 50 mg/m², and even more particularly preferably in a range of 25 to 50 mg/m². As described above, the range having a greater content per unit area of the fibrous metal particles of the fibrous metal particles-containing layer than that of a material of a transparent electrode pattern in a touch panel field disclosed in JP2012-238579A is preferable, from a viewpoint of increasing warming properties.

It is preferable that the fibrous metal particles-containing layer contains fibrous metal particles such as metal nanowires having an average short diameter of 1 to 35 nm and an average long diameter of 5 to 50 μm in a range of 10 to 500 mg/m², from a viewpoint of warming properties.

It is more preferable that the fibrous metal particles-containing layer contains fibrous metal particles such as metal nanowires having an average short diameter of 10 nm to 35 nm and an average long diameter of 5 μm to 40 μm in a range of 20 to 200 mg/m².

It is particularly preferable that the fibrous metal particles-containing layer contains fibrous metal particles such as metal nanowires having an average short diameter of 15 nm to 25 nm and an average long diameter of 5 μm to 15 μm in a range of 20 to 100 mg/m², and more particularly preferable that the fibrous metal particles-containing layer contains fibrous metal particles described above in a range of 25 to 50 mg/m².

—Manufacturing Method of Fibrous Metal Particles—

The fibrous metal particles such as metal nanowires are not particularly limited and may be manufactured by any method. As will be described below, it is preferable that the fibrous metal particles are manufactured by reducing metal ions in a solvent obtained by dissolving a halogen compound and a dispersing agent. After fibrous metal particles such as metal nanowires are formed, desalinization treatment is performed in a routine procedure, and this operation is preferable from viewpoints of dispersibility and temporal stability of the fibrous metal particles-containing layer.

As the manufacturing method of the fibrous metal particles such as metal nanowires, methods disclosed in JP2009-215594A, JP2009-242880A, JP2009-299162A, and JP2010-84173A, JP2010-86714 can be used.

As a solvent used in the manufacturing of the fibrous metal particles such as metal nanowires, a hydrophilic solvent is preferable, and examples thereof include water, an alcohol solvent, an ether solvent, and a ketone solvent. These may be used alone or in combination of two or more kinds thereof.

Examples of the alcohol solvent include methanol, ethanol, propanol, isopropanol, butanol, and ethylene glycol.

Examples of the ether solvent include dioxane and tetrahydrofuran. Examples of the ketone solvent include acetone and the like.

In a case of performing heating, a heating temperature thereof is preferably equal to or lower than 250° C., more preferably from 20° C. to 200° C., even more preferably from 30° C. to 180° C., and particularly preferably from 40° C. to 170° C. When the temperature is equal to or higher than 20° C., a length of the fibrous metal particles such as metal nanowires formed is in a preferable range so as to ensure dispersion stability, and when the temperature is equal to or lower than 250° C., the periphery of the cross section of the metal nanowires has a smooth shape without acute angles, and accordingly, coloration due to surface plasmon absorption of the metal particles is prevented. Therefore, the range thereof is preferable from a viewpoint of transparency.

The temperature may be changed during a particle formation process, if necessary, and the temperature change during the process may have effects of control of nucleus formation or prevention of regeneration of nucleus, and improvement of monodispersity due to improvement of selective growth.

The heating process is preferably performed by adding a reducing agent.

The reducing agent is not particularly limited and can be suitably selected from elements normally used. Examples thereof include borohydride metal salt, aluminum hydride salt, alkanolamine, aliphatic amine, heterocyclic amine, aromatic amine, aralkyl amine, alcohols, organic acids, reducing sugars, sugar alcohols, sodium sulfite, hydrazine compounds, dextrin, hydroquinone, hydroxylamine, ethylene glycol, and glutathione. Among these, reducing sugars, sugar alcohols as a derivative thereof, and ethylene glycol are particularly preferable.

As a reducing agent, a compound having a function as both of a dispersing agent or a solvent can be preferably used, in the same manner.

The fibrous metal particles such as metal nanowires are preferably manufactured by adding a dispersing agent and halogen compounds or metal halide fine particles.

The timing of adding a dispersing agent and halogen compounds may be before adding a reducing agent or after adding a reducing agent or may be before adding metal ions or metal halide fine particles or after adding metal ions or metal halide fine particles. In order to obtain fibrous metal particles having better monodispersity, the adding of halogen compounds is preferably divided into two or more steps, because nucleus formation and growth can be controlled.

The step of adding a dispersing agent is not particularly limited. A dispersion agent may be added before preparing the fibrous metal particles such as metal nanowires and the fibrous metal particles such as metal nanowires may be added under the presence of the dispersing agent, or a dispersing agent may be added after preparing the fibrous metal particles such as metal nanowires, in order to control a dispersion state.

Examples of the dispersing agent include an amino group-containing compound, a thiol group-containing compound, a sulfide group-containing compound, amino acid or a derivative thereof, a peptide compounds, polysaccharides, a polysaccharides-derived natural polymer, a synthetic polymer, and polymer compounds such as gel derived therefrom. Among these, various polymer compounds used as a dispersing agent are compounds contained in polymers which will be described below.

Preferable examples of polymers used as a dispersing agent include polymers including a hydrophilic group such as gelatin, polyvinyl alcohol, methyl cellulose, hydroxypropyl cellulose, polyalkylene amine, partial alkyl ester of polyacrylic acid, polyvinyl pyrrolidone, a copolymer having a polyvinyl pyrrolidone structure, and polyacrylic acid having an amino group or a thiol group which are protective colloid polymers.

A weight average molecular weight (Mw) of the polymer used as a dispersing agent measured by using gel permeation chromatography (GPC) is preferably from 3,000 to 300,000 and more preferably from 5,000 to 100,000.

The description in "Genryo No Jiten" (edited by Seijiro Ito, published by Asakura Publishing, 2000) can be referred for the structure of a compound capable of being used as a dispersion agent.

A shape of metal nanowires obtained can be changed depending on the kind of a dispersing agent used.

The halogen compound is not particularly limited, as long as it is a compound containing bromine, chlorine, and iodine, and can be suitably selected according to the purpose. Preferable examples thereof include alkali halide such as sodium bromide, sodium chloride, sodium iodide, potassium iodide, potassium bromide, or potassium chloride, or a compound capable of being used in combination with the following dispersion additive.

The halogen compound may function as a dispersion additive and the dispersion additive can be preferably used in the same manner.

Silver halide fine particles may be used as a substitute of the halogen compound, or a halogen compound and silver halide fine particles may be used in combination.

In addition, a single substance having both a function of a dispersing agent and a function of a halogen compound may be used. That is, both functions of a dispersing agent and a halogen compound are realized with one compound, by using a halogen compound having a function as a dispersing agent.

Examples of the halogen compound having a function as a dispersing agent include hexadecyl-trimethyl ammonium bromide containing an amino group and bromide ions, hexadecyl-trimethyl ammonium chloride containing an amino group and chloride ions, dodecyltrimethylammonium bromide containing an amino group and bromide ions or chloride ions, dodecyltrimethylammonium chloride, stearyltrimethylammonium bromide, stearyltrimethylammonium chloride, decyltrimethylammonium bromide, decyltrimethylammonium chloride, dimethyldistearylammonium bromide, dimethyldistearylammonium chloride, dilauryldimethylammonium bromide, dilauryldimethylammonium chloride, dimethyldipalmitylammonium bromide, and dimethyldipalmitylammonium chloride.

In the manufacturing method of the metal nanowires, it is preferable to perform desalinization treatment after forming the metal nanowires. The desalinization treatment after forming the metal nanowires can be performed by using methods such as ultrafiltration, dialysis, gel filtration, decantation, and centrifugal separation.

It is preferable that the fibrous metal particles such as metal nanowires do not contain inorganic ions such as alkali metal ions, alkali earth metal ions, and halide ions, if possible. Electric conductivity of a dispersed material obtained by dispersing metal nanowires in an aqueous solvent is preferably equal to or smaller than 1 mS/cm, more preferably equal to or smaller than 0.1 mS/cm, and even more preferably equal to or smaller than 0.05 mS/cm.

Viscosity of the aqueous dispersed material of the fibrous metal particles such as metal nanowires at 25° C. is preferably from 0.5 mPa·s to 100 mPa·s and more preferably from 1 mPa·s to 50 mPa·s.

The electric conductivity and the viscosity are measured by setting concentration of the fibrous metal particles such as metal nanowires in the aqueous dispersed material as 0.45% by mass. In a case where the concentration of the fibrous metal particles such as metal nanowires in the aqueous dispersed material is higher than the above-mentioned concentration, the measurement is performed by diluting the aqueous dispersed material with a distilled water.

An average film thickness of the fibrous metal particles-containing layer is normally selected from a range of 0.005 μm to 2 μm. For example, when the average film thickness thereof is from 0.001 μm to 0.5 m, sufficient durability and film strength are obtained. Particularly, the average film thickness thereof is preferably in a range of 0.01 μm to 0.1 μm, because the allowable range in the manufacturing can be ensured.

In the invention, it is preferable that, by providing a fibrous metal particles-containing layer satisfying at least one of the following condition (i) or (ii), high warming properties and transparency are maintained, fibrous metal particles such as metal nanowires are stably solidified due to a sol-gel hardened material, and high strength and durability are realized. Even when the fibrous metal particles-containing layer is a thin layer having a film thickness of 0.005 μm to 0.5 μm, for example, it is possible to obtain a fibrous metal particles-containing layer having abrasion resistance, heat resistance, moist heat resistance, and bending resistance without practical problems. Accordingly, the heat insulating window film of the embodiment of the invention is suitably used for various purposes. When it is necessary to provide a thin layer, a film thickness thereof may be from 0.005 μm to 0.5 μm, preferably from 0.007 μm to 0.3 μm, more preferably from 0.008 μm to 0.2 μm, and particularly preferably from 0.01 μm to 0.1 μm. By setting the fibrous metal particles-containing layer to be a thinner layer as described above, transparency of the fibrous metal particles-containing layer is further improved.

Regarding an average film thickness of the fibrous metal particles-containing layer, film thicknesses of five spots of the fibrous metal particles-containing layer are measured by directly observing the cross section of the fibrous metal particles-containing layer using an electron microscope, and an arithmetic average value thereof is calculated. In addition, the film thickness of the fibrous metal particles-containing layer can also be measured as a level difference between a portion where the fibrous metal particles-containing layer is formed and a portion where the fibrous metal particles-containing layer is removed, by using a stylus type surface shape measurement device (Dektak (registered trademark) 150, manufactured by Bruker AXS K.K). However, some parts of the support may be removed when removing the fibrous metal particles-containing layer and an error regarding the fibrous metal particles-containing layer formed easily occurs, because the fibrous metal particles-containing layer is a thin film. Therefore, in the following examples, the average film thickness measured by using an electron microscope is shown.

It is preferable that the fibrous metal particles-containing layer has excellent abrasion resistance. This abrasion resistance can be evaluated, for example, by using a method of (1) or (2) disclosed in paragraph "0067" of JP2013-225461A.

(Matrix)

The fibrous metal particles-containing layer may contain a matrix. Here, a "matrix" is a general term of substances forming a layer including fibrous metal particles such as metal nanowires. By containing a matrix, a dispersion state of fibrous metal particles such as metal nanowires of the fibrous metal particles-containing layer is stably maintained, and even in a case where the fibrous metal particles-containing layer is formed on the surface of the support without using the adhesive layers, strong adhesion between the support and the fibrous metal particles-containing layer tends to be ensured.

—Sol-Gel Hardened Material—

The fibrous metal particles-containing layer preferably contains a sol-gel hardened material having a function as a matrix, and more preferably contains a sol-gel hardened material obtained by hydrolysis and polycondensation of an alkoxide compound of an element (b) selected from the group consisting of Si, Ti, Zr, and Al.

The fibrous metal particles-containing layer more preferably contains at least a metal element (a), metal nanowires having an average short diameter equal to or smaller than 150 nm, and a sol-gel hardened material obtained by hydrolysis and polycondensation of an alkoxide compound of an element (b) selected from the group consisting of Si, Ti, Zr, and Al.

The fibrous metal particles-containing layer preferably satisfies at least one of the following condition (i) or (ii), more preferably satisfies at least the following conditions (ii), and particularly preferably satisfies the following conditions (i) and (ii).

(i) A ratio of substance quantity of the element (b) contained in the fibrous metal particles-containing layer and substance quantity of the metal element (a) contained in the fibrous metal particles-containing layer [molar number of (element (b))/molar number of (metal element (a))] is in a range of 0.10/1 to 22/1.

(ii) A ratio of a mass of the alkoxide compound used for forming the sol-gel hardened material in the fibrous metal particles-containing layer to a mass of metal nanowires contained in the fibrous metal particles-containing layer [(content of alkoxide compound)/(content of metal nanowires)] is in a range of 0.25/1 to 30/1.

It is preferable that the fibrous metal particles-containing layer is formed so that a ratio of a usage amount of a specified alkoxide compound with respect to a usage amount of metal nanowires, that is, a ratio of [(mass of specified alkoxide compound)/(mass of metal nanowires)] is in a range of 0.25/1 to 30/1. In a case where the mass ratio is equal to or greater than 0.25/1, it is possible to obtain a fibrous metal particles-containing layer having excellent warming properties and transparency, and excellent abrasion resistance, heat resistance, moist heat resistance, and bending resistance. In a case where the mass ratio is equal to or smaller than 30/1, it is possible to obtain a fibrous metal particles-containing layer having excellent bending resistance.

The mass ratio is more preferably in a range of 0.5/1 to 25/1, even more preferably in a range of 1/1 to 20/1, and most preferably in a range of 2/1 to 15/1. By setting the mass ratio to be in the preferable range, the fibrous metal particles-containing layer obtained has high warming properties and high transparency, and excellent abrasion resistance, heat resistance, moist heat resistance, and bending resistance, and accordingly, it is possible to stably obtain a heat insulating window film having suitable physical properties.

As an optimal aspect, in the fibrous metal particles-containing layer, the ratio of substance quantity of the element (b) and substance quantity of the metal element (a) [molar number of (element (b))/molar number of (metal element (a))] is in a range of 0.10/1 to 22/1. The molar ratio is more preferably from 0.20/1 to 18/1, particularly preferably from 0.45/1 to 15/1, more particularly preferably from 0.90/1 to 11/1, and even more particularly preferably from 1.5/1 to 10/1.

When the molar ratio is in the range described above, the fibrous metal particles-containing layer has both of warming properties and transparency, and has excellent abrasion resistance, heat resistance, moist heat resistance, and bending resistance, from a viewpoint of physical properties.

The specified alkoxide compound used when forming the fibrous metal particles-containing layer is used up due to hydrolysis and polycondensation and substantially no alkoxide compound is present in the fibrous metal particles-containing layer, but the fibrous metal particles-containing layer obtained contains the element (b) such as Si or the like derived from the specified alkoxide compound. By adjusting the ratio of the substance quantity of the element (b) such as Si contained and the metal element (a) derived from metal nanowires, the fibrous metal particles-containing layer having excellent properties is formed.

A component of the element (b) selected from the group consisting of Si, Ti, Zr, and Al derived from the specified alkoxide compound of the fibrous metal particles-containing layer and a component of the metal element (a) derived from metal nanowires can be analyzed by the following method.

That is, the ratio of the substance quantity, that is, the value of (component molar number of element (b))/(component molar number of (metal element (a)) can be calculated by performing X ray photoelectron analysis (Electron Spectroscopy FOR Chemical Analysis (ESCA)) with respect to the fibrous metal particles-containing layer. However, since measurement sensitivity is different depending on an element in the analysis method using ESCA, a value obtained does not necessarily directly show a molar ratio of the element components. Accordingly, a calibration curve is drawn by using a fibrous metal particles-containing layer having a well-known molar ratio of element components in advance, and a ratio of substance quantity of the actual fibrous metal particles-containing layer can be calculated from the calibration curve. As the molar ratio of each element in this specification, a value calculated by using the following method is used.

The heat insulating window film preferably exhibits effects of obtaining high warming properties and transparency and excellent abrasion resistance, heat resistance, moist heat resistance, and bending resistance. The reason of exhibiting such effects is not clear, but the following reasons are assumed.

That is, since the fibrous metal particles-containing layer contains metal nanowires, and a matrix which is a sol-gel hardened material obtained by hydrolysis and polycondensation of the specified alkoxide compound, a dense fibrous metal particles-containing layer having less voids and high crosslinking density is formed, even when the rate of the matrix contained in the fibrous metal particles-containing layer is small, compared to a fibrous metal particles-containing layer containing a general organic polymer resin (for example, an acrylic resin, a vinyl polymerization resin, or the like) as a matrix, and accordingly, a heat insulating window film having excellent abrasion resistance, heat resistance, and moist heat resistance is obtained. It is assumed that, by satisfying any one of setting the content molar ratio of the element (b) derived from the specified alkoxide compound/metal element (a) derived from metal nanowires in a range of 0.25/1 to 30/1 and setting the mass ratio of the specified alkoxide compound/metal nanowires in a range of 0.25/1 to 30/1, in relation to the above-mentioned content molar ratio which is in a range of 0.25/1 to 30/1, the operation is improved with good balance, warming properties and transparency are maintained, and excellent abrasion resistance, heat resistance, and moist heat resistance, and excellent bending resistance are exhibited.

—Other Matrix—

The sol-gel hardened material contained in the fibrous metal particles-containing layer has a function as a matrix, but the fibrous metal particles-containing layer may further contain matrix other than the sol-gel hardened material (hereinafter, referred to as other matrix). The fibrous metal particles-containing layer containing other matrix contains a material capable of forming other matrix in a liquid composition which will be described later, and may be formed by applying this on the support.

The other matrix may be nonphotosensitive such as an organic polymer or may be photosensitive such as a photoresist composition.

In a case where the fibrous metal particles-containing layer contains other matrix, the content thereof is from 0.10% by mass to 20% by mass, preferably from 0.15% by mass to 10% by mass, and even more preferably from 0.20% by mass to 5% by mass, with respect to the content of the sol-gel hardened material derived from the specified alkoxide compound contained in the fibrous metal particles-containing layer, because a fibrous metal particles-containing layer having excellent warming properties, transparency, film strength, abrasion resistance, and bending resistance is obtained.

The other matrix may be nonphotosensitive or may be photosensitive as described above. A nonphotosensitive matrix is preferable.

—Organic Polymer—

The preferable nonphotosensitive matrix contains an organic polymer. Specific examples of the organic polymer include polyacrylic acid such as polymethacrylic acid, polymethacrylate (for example, poly (methyl methacrylate)), polyacrylate, or polyacrylonitrile, a highly aromatic polymer such as polyvinyl alcohol, polyester (e.g., polyethylene terephthalate (PET), polyester naphthalate, and polycarbonate), phenol or cresol formaldehyde (Novolacs (registered trademark)), polystyrene, polyvinyl toluene, polyvinyl xylene, polyimide, polyamide, polyamideimide, polyetherimide, polysulfide, polysulfone, polyphenylene, or polyphenylether, polyurethane, epoxy, polyolefin (e.g., polypropylene, polymethylpentene, and cyclic olefins), acrylonitrile-butadiene-styrene copolymer, cellulose, silicone, and other silicon-containing polymer (for example, polysilsesquioxane and polysilane), polyvinyl chloride, polyvinyl acetate, polynorbornene, synthetic rubber, (for example, ethylene propylene rubber (EPR), styrene-butadiene rubber (SBR), ethylene propylene diene monomer rubber (EPDM)), and a fluorocarbon-based polymer (for example, polyvinylidene fluoride, polytetrafluoroethylene, or polyhexafluoropropylene), a fluoro-olefin copolymer, hydrocarbon olefin (for example, "LUMIFLON" (registered trademark) manufactured by Asahi Glass Co., Ltd.), an amorphous fluorocarbon polymer or copolymer (for example, "CYTOP" (registered trademark) manufactured by Asahi Glass Co., Ltd., and "Teflon" (registered trademark) AF manufactured by Dupont), and there is no limitation.

—Crosslinking Agent—

A crosslinking agent is a compound which forms a chemical bond by free radicals or acids and heat and hardens a fibrous metal particles-containing layer, and examples thereof include a melamine-based compound substituted with at least one selected from a methylol group, an alkoxymethyl group, and an acyloxymethyl group, a guanamine-based compound, a glycoluril-based compound, a urea-based compound, a phenol-based compound or an ether compound of phenol, an epoxy-based compound, an oxetane-based compound, a thioepoxy-based compound, an isocyanate-based compound, or an amide-based compound, and a compound having an ethylenically unsaturated group containing a methacryloyl group or an acryloyl group. Among these, an epoxy-based compound, an oxetane-based compound, and a compound having an ethylenically unsaturated group are particularly preferable, from viewpoints of film properties, heat resistance, and solvent resistance.

An oxetane-based compound can be used alone or in a mixture with an epoxy resin. Particularly, it is preferable to use an oxetane-based compound together with an epoxy resin, from viewpoints of high reactivity and improvement of film properties.

When the total mass of a solid content of a photopolymerizable composition containing the fibrous metal particles such as metal nanowires described above is 100 parts by mass, the content of the crosslinking agent in the fibrous metal particles-containing layer is preferably from 1 part by mass to 250 parts by mass and more preferably from 3 part by mass to 200 parts by mass.

—Dispersing Agent—

A dispersing agent is used for dispersing the fibrous metal particles such as metal nanowires in the photopolymerizable composition while preventing aggregation thereof. The dispersing agent is not particularly limited as long as it can disperse metal nanowires and can be suitably selected according to the purpose. For example, a dispersing agent which is commercially available as a pigment dispersing agent can be used, and it is preferable to use particularly a polymer dispersing agent having properties of being adsorbed to metal wires. Examples of such a polymer dispersing agent include polyvinylpyrrolidone, BYK SERIES (registered trademark, manufactured by BYK Additives & Instruments), SOLSPERSE SERIES (manufactured by The Lubrizol Corporation), and AJISPER SERIES (manufactured by Ajinomoto Co., Inc.).

The content of the dispersing agent in the fibrous metal particles-containing layer is preferably from 0.1 parts by mass to 50 parts by mass, more preferably from 0.5 parts by mass to 40 parts by mass, and particularly preferably from 1 part by mass to 30 parts by mass, with respect to 100 parts by mass of a binder in a case of using a binder disclosed in paragraphs "0086" to "0095" of JP2013-225461A.

When the content of the dispersing agent with respect to the binder is equal to or greater than 0.1 parts by mass, aggregation of the fibrous metal particles such as metal nanowires in a dispersion liquid is effectively prevented, and when the content thereof is equal to or smaller than 50 parts by mass, a stable liquid film is formed in a coating step and generation of coating unevenness is prevented, and thus, the ranges described above are preferable.

—Solvent—

A solvent is a component used for preparing a coating solution for forming a composition containing the fibrous metal particles such as metal nanowires, the specified alkoxide compound, and the photopolymerizable composition on the surface of the support or a surface of an adhesive layer of an adhesive layer-attached support to have a film shape, and can be suitably selected according to the purpose. Examples thereof include propylene glycol monomethyl ether, propylene glycol monomethyl ether acetate, ethyl 3-ethoxypropionate, methyl 3-methoxypropionate, ethyl lactate, 3-methoxy butanol, water, 1-methoxy-2-propanol, isopropyl acetate, methyl lactate, N-methylpyrrolidone, γ-butyrolactone, and propylene carbonate. This solvent may serve as at least some of the solvent of the dispersion liquid of the metal nanowires described above. These may be used alone or in combination of two or more kinds thereof.

A concentration of solid contents of the coating solution containing the solvent is preferably in a range of 0.1% by mass to 20% by mass.

—Metal Corrosion Inhibitor—

The fibrous metal particles-containing layer preferably contains a metal corrosion inhibitor of the fibrous metal particles such as metal nanowires. The metal corrosion inhibitor is not particularly limited and can be suitably selected according to the purposes. Thiols or azoles are suitable, for example.

When the metal corrosion inhibitor is included, it is possible to exhibit an antirust effect and to prevent a decrease in warming properties and transparency of the fibrous metal particles-containing layer over time. The metal corrosion inhibitor can be applied by being added into a composition for forming the fibrous metal particles-containing layer in a state of being suitably dissolved with a solvent or in a state of powder, or manufacturing a fibrous metal particles-containing layer using a coating solution for a fibrous metal particles-containing layer which will be described later and then dipping the fibrous metal particles-containing layer in a metal corrosion inhibitor bath.

In a case of adding the metal corrosion inhibitor, the content thereof in the fibrous metal particles-containing layer is preferably from 0.5% by mass to 10% by mass with respect to the content of the fibrous metal particles such as metal nanowires.

As the other matrix, the polymer compound of the dispersing agent used when preparing the fibrous metal particles such as metal nanowires described above can be used as at least a part of components configuring the matrix.

—Other Conductive Material—

The fibrous metal particles-containing layer may contain other conductive materials, for example, conductive particles, in addition to the fibrous metal particles such as metal nanowires, within a range not degrading the effects of the invention. From a viewpoint of the effect, a content ratio of the fibrous metal particles such as metal nanowires (preferably, metal nanowires having an aspect ratio equal to or greater than 10) is preferably equal to or greater than 50%, more preferably equal to or greater than 60%, and particularly preferably equal to or greater than 75%, based on volume, with respect to the total amount of the conductive material containing the fibrous metal particles such as metal nanowires. When the content ratio of the fibrous metal particles such as metal nanowires is 50%, a fine network of the fibrous metal particles such as metal nanowires is formed and a fibrous metal particles-containing layer having high conductivity can be easily formed.

The conductive particles other than the fibrous metal particles such as metal nanowires may not significantly contribute to conductivity of the fibrous metal particles-containing layer and may have absorption in a visible light region. It is particularly preferable that the conductive particles are metal and do not have a shape with strong plasmon absorption such as a spherical shape, from a viewpoint of not deteriorating transparency of the fibrous metal particles-containing layer.

Here, a percentage of the fibrous metal particles such as metal nanowires can be acquired as follows. For example, in a case where the fibrous metal particles are silver nanowires and the conductive particles are silver particles, a silver nanowire dispersion liquid is filtered to separate silver nanowires and other conductive particles, each of an amount of silver remaining on the filter paper and an amount of silver transmitted through the filter paper are measured by using a inductively coupled plasma (ICP) emission analysis device, and the percentage of the metal nanowires can be calculated. The aspect ratio of the fibrous metal particles such as metal nanowires is calculated by observing the fibrous metal particles such as metal nanowires remaining on the filter paper using a TEM and measuring each of short diameters and long diameters of the fibrous metal particles such as 300 metal nanowires.

The measurement method of the average short diameter and the average long diameter of the fibrous metal particles such as metal nanowires are as described above.

(Manufacturing Method of Fibrous Metal Particles-Containing Layer)

A manufacturing method of the fibrous metal particles-containing layer is not particularly limited. In the preferred embodiment, as a method of forming the fibrous metal particles-containing layer on a support, the fibrous metal particles-containing layer can be manufactured by a method at least containing: forming a liquid film by applying a liquid composition (hereinafter, also referred to as a "sol-gel coating solution) containing the fibrous metal particles such as metal nanowires having an average short diameter equal to or smaller than 150 nm and the specified alkoxide compound so that the mass ratio thereof (that is, (content of specified alkoxide compound)/(content of metal nanowires)) is in a range of 0.25/1 to 30/1 or the content molar ratio of the element (b) derived from the specified alkoxide compound and the metal element (a) derived from the metal nanowires is in a range of 0.10/1 to 22/1, on a support; and forming a fibrous metal particles-containing layer by allowing a reaction such as hydrolysis and polycondensation of the specified alkoxide compound in the liquid film (hereinafter, this reaction such as hydrolysis and polycondensation is also referred to as a "sol-gel reaction"). This method may or may not further include evaporating (drying) performed by heating water contained in the liquid composition as a solvent, if necessary.

In the embodiment, by using the sol-gel coating solution, an aqueous dispersion liquid of metal nanowires is prepared or the metal nanowires and the specified alkoxide compound may be mixed to prepare an aqueous dispersion. In the embodiment, an aqueous solution containing the specified alkoxide compound is prepared, this aqueous solution is heated, at least some parts of the specified alkoxide compound are subjected to hydrolysis and polycondensation to set a sol state, and the aqueous solution in the sol state and the aqueous dispersion liquid of metal nanowires may be mixed to prepare a sol-gel coating solution.

In order to promote a sol-gel reaction, it is practically preferable to use an acid catalyst or a basic catalyst together, in order to improve reaction efficiency.

As a preparation method of a dispersion liquid for the fibrous metal particles-containing layer, two aspects including an aspect represented by a dispersion liquid preparation method 1-A and an aspect represented by a dispersion liquid preparation method 1-B described in examples which will be described later. The aspect represented by a dispersion liquid preparation method 1-A is more preferable from a viewpoint of easily synthesizing fibrous metal particles such as finer (small short diameter) metal nanowires.

—Solvent—

The liquid composition may contain water and/or an organic solvent, if necessary. By containing an organic solvent, a more uniform liquid film can be formed on the support.

Examples of such an organic solvent include a ketone-based solvent such as acetone, methyl ethyl ketone, or diethyl ketone, an alcohol-based solvent such as methanol, ethanol, 2-propanol, 1-propanol, 1-butanol, or tert-butanol, a chlorine-based solvent such as chloroform or methylene chloride, an aromatic solvent such as benzene or toluene, an ester-based solvent such as ethyl acetate, butyl acetate, or isopropyl acetate, an ether-based solvent such as diethyl ether, tetrahydrofuran, or dioxane, and a glycol ether-based solvent such as ethylene glycol monomethyl ether or ethylene glycol dimethyl ether. In a case where the liquid composition contains the organic solvent, the content thereof is preferably in a range of equal to or smaller than 50% by mass and more preferably in a range of equal to or smaller than 30% by mass, with respect to the total mass of the liquid composition.

A reaction such as hydrolysis and polycondensation of the specified alkoxide compound occurs in the coating liquid film of the sol-gel coating solution formed on the support, and in order to promote the reaction, it is preferable that the coating liquid film is heated and dried. A heating temperature for promoting the sol-gel reaction is suitably in a range of 30° C. to 200° C. and more preferably in a range of 50° C. to 180° C. The heating and drying time is preferably from 10 seconds to 300 minutes and more preferably from 1 minute to 120 minutes.

—Formation Method of Fibrous Metal Particles-Containing Layer—

A method of forming the fibrous metal particles-containing layer described above on the support is not particularly limited. General coating methods can be used and any method can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

<Interlayer>

It is preferable that the heat insulating window film includes at least one interlayer between the support and the fibrous metal particles-containing layer. When the interlayer is provided between the support and the fibrous metal particles-containing layer, at least one of adhesiveness between the support and the fibrous metal particles-containing layer, visible light transmittance of the fibrous metal particles-containing layer, the haze of the fibrous metal particles-containing layer, or film strength of the fibrous metal particles-containing layer can be improved.

As the interlayer, an adhesive layer for improving adhesiveness between the support and the fibrous metal particles-containing layer or a functional layer for improving functionality with interaction with a component contained in the fibrous metal particles-containing layer is used, and the interlayer is suitably selected according to the purpose.

A configuration of the heat insulating window film further including the interlayer will be described with reference to the drawing.

In FIG. 2, the fibrous metal particles-containing layer 20 is provided on the adhesive layer-attached support 101 which is formed by providing the interlayer (adhesive layer 31) on the support. The interlayer including the first adhesive layer having excellent affinity with the support 10 and the second adhesive layer having excellent affinity with fibrous metal particles-containing layer 20 is preferably provided between the support 10 and the fibrous metal particles-containing layer 20.

An interlayer having a configuration other than that of FIG. 2 may be provided, and for example, it is also preferable that an interlayer including a functional layer adjacent to the fibrous metal particles-containing layer 20 is provided between the support 10 and the fibrous metal particles-containing layer 20, in addition to the first adhesive layer and the second adhesive layer which are the same as those in the first embodiment (not shown).

A material used for the interlayer is not particularly limited and materials for improving at least any one of the properties described above may be used.

For example, in a case of including the adhesive layer as the interlayer, materials selected from a polymer used in an adhesive, a silane coupling agent, a titanium coupling agent, and a sol-gel film obtained by allowing hydrolysis and polycondensation of the alkoxide compound of Si are contained in the adhesive layer.

It is preferable that the interlayer adjacent to the fibrous metal particles-containing layer (that is, in a case where the interlayer is a single layer, the interlayer adjacent to the fibrous metal particles-containing layer, and in a case where the interlayer includes a plurality of sub-interlayers, the sub-interlayer adjacent to the fibrous metal particles-containing layer) is a functional layer including a compound including a functional group (hereinafter, referred to as "interaction-capable functional group") capable of allowing electrostatic interaction with the fibrous metal particles such as metal nanowires contained in the fibrous metal particles-containing layer 20, because a fibrous metal particles-containing layer having excellent visible light transmission, haze, and film strength is obtained. In a case of including such an interlayer, even when the fibrous metal particles-containing layer 20 includes the fibrous metal particles such as metal nanowires and the organic polymer, a fibrous metal particles-containing layer having excellent film strength is obtained.

Although the reason is not clear, when the interlayer including a compound including the interaction-capable functional group with the fibrous metal particles such as metal nanowires contained in the fibrous metal particles-containing layer 20 is provided, aggregation of the fibrous metal particles of the fibrous metal particles-containing layer is prevented, even dispersibility is improved, a decrease in transparency haze caused by the aggregation of the fibrous metal particles of the fibrous metal particles-containing layer is prevented, and the improvement of film strength due to adhesiveness is achieved, due to the interaction between the fibrous metal particles such as metal nanowires contained in the fibrous metal particles-containing layer and the compound including functional group described above contained in the interlayer. The interlayer which can exhibit such interaction may be referred to as a functional layer, hereinafter. The functional layer exhibits the effects described above by allowing the interaction with the fibrous metal particles such as metal nanowires. Accordingly, when the fibrous metal particles-containing layer contains the fibrous metal particles such as metal nanowires, the effects described above are realized without depending on the matrix contained in the fibrous metal particles-containing layer.

In a case where the fibrous metal particles such as metal nanowires are silver nanowires, for example, examples of the interaction-capable functional group with the fibrous metal particles such as metal nanowires include an amido group, an amino group, a mercapto group, a carboxylic acid group, a sulfonic acid group, a phosphoric acid group, and a phosphonic acid group or salt thereof, and a compound containing one or a plurality of functional groups selected from these is more preferable. As the functional group, an amino group, a mercapto group, a phosphoric acid group, and a phosphonic acid group or salt thereof are more preferable and an amino group is even more preferable.

Examples of the compound including the functional group include compounds including an amido group such as ureidopropyltriethoxysilane, polyacrylamide, or polymethacrylamide, compounds including an amino group such as N-β(aminoethyl) γ-aminopropyltrimethoxysilane, 3-aminopropyltriethoxysilane, bis(hexamethylene)triamine, N,N'-bis(3-aminopropyl)-1,4-butanediamine tetrahydrochloride, spermine, diethylenetriamine, meth-xylenediamine, or metaphenylene diamine, compounds including a mercapto group such as 3-mercaptopropyltrimethoxysilane, 2-mercaptobenzothiazole, or toluene-3,4-dithiol, compounds including a group of sulfonic acid or salt thereof such as poly(sodium para-styrene sulfonate), or poly(2-acrylamido-2-methylpropane sulfonate), compounds including a carboxylic acid group such as polyacrylic acid, polymethacrylic acid, polyaspartic acid, terephthalic acid, cinnamic acid, fumaric acid, or succinic acid, compounds including a phosphoric acid group such as PHOSMER PE, PHOSMER CL, PHOSMER M, and PHOSMER MH (product name, manufactured by Uni-Chemical Co., Ltd.) and polymers thereof, POLYPHOSMER M-101, POLYPHOSMER PE-201, and POLYPHOSMER MH-301 (product name, manufactured by DAP Co., Ltd.), and compounds including a phosphonic acid group such as phenylphosphonic acid, decylphosphonic acid, methylene diphosphonic acid, vinylphosphonic acid, or allylphosphonic acid.

By selecting these functional groups, aggregation of the fibrous metal particles such as metal nanowires is prevented when applying a coating solution for forming a fibrous metal particles-containing layer and allowing interaction between the fibrous metal particles such as metal nanowires and the functional groups contained in the interlayer and drying, and a fibrous metal particles-containing layer in which the fibrous metal particles such as metal nanowires are uniformly dispersed can be formed.

The interlayer can be formed by applying liquid obtained by dissolving, dispersing, or emulsifying compounds configuring the interlayer on the support and drying the liquid, and general methods can be used as the application method. The method thereof is not particularly limited and can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

<Protective Layer>

The heat insulating window film may include a protective layer (not shown) on the fibrous metal particles-containing layer (reference numeral 20 in FIG. 1). The protective layer is not particularly limited and is preferably has excellent abrasion resistance.

<Near Infrared Shielding Material>

In the heat insulating window film, a near infrared shielding material is further preferably used, from a viewpoint of improving warming properties or yellowing at the time of exhaust gas exposure by using a near infrared shielding material in the fibrous metal particles-containing layer. A mechanism of improving warming properties or yellowing at the time of exhaust gas exposure is not limited to a certain theory, but it is considered that, sunlight contains a large quantity of near infrared light and the fibrous metal particles are degraded when the fibrous metal particles absorb this near infrared light, but the near infrared shielding material prevents this phenomenon.

By using the near infrared shielding material, it is possible to decrease a shade factor of the heat insulating window film, if necessary, and to decrease a quantity of heat flow for sunlight.

However, in a case of using the heat insulating window film in an electric car, it is advantageous that the heat insulating window film does not have a heat shielding function. This is because that fuel efficiency of an electric car significantly decreases by controlling heating during the winter, than cooling during the summer, and thus, transmission of near infrared rays is rather desired.

Examples of the near infrared shielding material include plate-shaped metal particles (for example, silver nanodiscs), an organic multilayer film, and spherical metal oxide particles (for example, tin-doped indium oxide (indium tin oxide; ITO) particles, antimony-doped tin oxide (antimony tin oxide; ATO) particles, cesium-doped tungsten oxide (CWO) particles).

A near infrared shielding layer is preferably formed by using the near infrared shielding materials.

(Near Infrared Shielding Layer Using Plate-Shaped Metal Particles)

From a viewpoint of heat ray shielding properties (solar heat gain coefficient), a heat ray reflection type which does not cause re-radiation is desirable, compared to a heat ray absorption type in which re-radiation of absorbed light into a room (approximately ⅓ amount of solar radiation energy absorbed) is performed. From a viewpoint of reflection of near infrared ray, plate-shaped metal particles are preferably used as the near infrared shielding material. In the near infrared shielding layer using the plate-shaped metal particles, near infrared shielding materials disclosed in paragraphs "0019" to "0046" of JP2013-228694A, JP2013-083974A, JP2013-080222A, JP2013-080221A, JP2013-077007A, and JP2013-068945A can be used and the description in these documents is incorporated in this specification.

Specifically, the near infrared shielding layer is a layer containing at least one kind of metal particles, and the metal particles preferably contain 60% by number or more of plate-shaped metal particles having a hexagonal or circular shape, and the principal plane of the plate-shaped metal particles having a hexagonal or circular shape is preferably plane-oriented in a range of averagely 0° to ±30° with respect to one surface of the near infrared shielding layer.

The metal particles are not particularly limited, as long as metal particles contains 60% by number or more of plate-shaped metal particles having a hexagonal or circular shape and the principal plane of the plate-shaped metal particles having a hexagonal or circular shape is plane-oriented in a range of averagely 0° to ±300 with respect to one surface of the near infrared shielding layer, and can be suitably selected according to the purpose.

A material of the metal particles is not particularly limited and can be suitably selected according to the purpose. Preferable examples thereof include silver, gold, aluminum, copper, rhodium, nickel, and platinum, from a viewpoint of high reflectivity of heat rays (near infrared rays).

—Plate-Shaped Metal Particles—

The plate-shaped metal particles are not particularly limited as long as the plate-shaped metal particles have two principal plane and can be suitably selected according to the purpose. The shape thereof is a hexagonal shape, a circular shape, or a triangular shape. Among these, the plate-shaped metal particles more preferably have a hexagonal or more polygonal shape or a circular shape and particularly preferably have a hexagonal shape or a circular shape, from a viewpoint of high visible light transmittance.

A material of the plate-shaped metal particles is not particularly limited and the same material as that of the metal particles can be suitably selected according to the purpose. The plate-shaped metal particles preferably contain at least silver.

A method of evaluating whether or not the principal plane of the plate-shaped metal particles is plane-oriented with respect to one surface of the near infrared shielding layer (surface of support) is not particularly limited and can be suitably selected according to the purpose. For example, a method of preparing an appropriate cross section piece and performing the evaluation by observing the near infrared shielding layer (surface of support) and the plate-shaped metal particles of this piece may be used. Specifically, a method of preparing a cross section sample or a cross section piece sample of the near infrared shielding layer by using a microtome or a focused ion beam (FIB) and performing an evaluation from an image obtained by observing the sectional shape or the sectional piece sample by using various microscope (for example, field emission scanning electron microscope (FE-SEM)) is used.

A plasmon resonance wavelength λ of metal configuring the plate-shaped metal particles of the near infrared shielding layer is not particularly limited and can be suitably selected according to the purpose. The plasmon resonance wavelength thereof is preferably from 400 nm to 2,500 nm from a viewpoint of imparting heat ray reflection performance, and is more preferably from 700 nm to 2,500 nm from a viewpoint of imparting visible light transmittance.

—Medium of Near Infrared Shielding Layer—

A medium of the near infrared shielding layer is not particularly limited and can be suitably selected according to the purpose. The near infrared shielding layer preferably contains polymers and more preferably contains transparent polymers. Examples of polymers include polymers such as a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and natural polymer such as gelatin and cellulose. Among these, in the invention, the main polymer of the polymer is preferably a polyvinyl alcohol resin, a polyvinyl butyral resin, a polyvinyl chloride resin, a (saturated) polyester resin, and a polyurethane resin, more preferably a polyester resin, and a polyurethane resin, in order to easily make 80% by number or more plate-shaped metal particles having a hexagonal or circular shape present in a range of d/2 from the surface of the near infrared shielding layer, and particularly preferably a polyester resin, in order to further improve rubbing resistance of a heat ray shielding layer of the invention. The main polymer of the polymer contained in the near infrared shielding layer is referred to as a polymer component occupying 50% by mass or more of polymer contained in the near infrared shielding layer.

A refractive index n of the medium is preferably from 1.4 to 1.7.

—Thickness of Near Infrared Shielding Layer—

In a thickness d of the near infrared shielding layer, when a thickness of metal particles is set as a and an average particle diameter (average equivalent circle diameter) is set as b, it is preferable to satisfy a relationship of $a/2 \leq d \leq 2b$ and it is more preferable to satisfy a relationship of $a \leq d \leq b$.

—Synthesis Method of Plate-Shaped Metal Particles—

A synthesis method of the plate-shaped metal particles is not particularly limited as long as plate-shaped metal particles having a hexagonal or circular shape are obtained, and can be suitably selected according to the purpose. Examples thereof include liquid phase methods such as a chemical reduction method, a photochemical reduction method, and an electrochemical reduction method. Among these, liquid phase methods such as a chemical reduction method and a photochemical reduction method are particularly preferable, from a viewpoint of controllability of a shape and a size. After the synthesis of the plate-shaped metal particles having a hexagonal or triangular shape, etching treatment using dissolving elements for dissolving silver such as nitric acid or sodium sulfite or etching treatment using heating is performed to get blunt angles of the plate-shaped metal particles having a hexagonal or triangular shape, and the plate-shaped metal particles having a hexagonal or circular shape may be obtained.

—Adding Various Additives—

An antioxidant such as mercaptotetrazole or ascorbic acid may be adsorbed to the plate-shaped metal particles, in order to prevent oxidation of metal such as silver configuring the plate-shaped metal particles. An oxidation sacrificing layer formed of Ni or the like may be formed on the surface of the plate-shaped metal particles in order for oxidation prevention. In addition, the plate-shaped metal particles may be coated with a metal oxide film such as $SiO_2$, in order to shield oxygen.

A dispersing agent such as a low-molecular dispersing agent or a polymer dispersing agent containing at least any one of quaternary ammonium salt, N element such as amines, S element, or P element, for example, may be added to the plate-shaped metal particles, in order to impart dispersibility.

(Organic Multilayer Film and Spherical Metal Oxide Particles)

As the near infrared shielding layer using an organic multilayer film, a layer disclosed in paragraphs "0039" to "0044" of JP2012-256041A can be preferably used and the description in this document is incorporated in this specification.

As the near infrared shielding layer using spherical metal oxide particles, layers disclosed in paragraphs "0038" and "0039" of JP2013-37013A and paragraphs "0060" and "0061" of JP2013-228698A can be preferably used and the description in this document is incorporated in this specification.

[Heat Insulating Material for Window]

A heat insulating material for a window according to a first aspect of the invention is a heat insulating material for a window in which the heat insulating window film of the invention and a substrate having a thickness equal to or greater than 0.5 mm are bonded to each other by using a pressure sensitive adhesive layer.

A heat insulating material for a window according to a second aspect of the invention is a heat insulating material for a window which includes a substrate having a thickness equal to or greater than 0.5 mm and the fibrous metal particles-containing layer containing fibrous metal particles, in which the fibrous metal particles contains silver or an alloy of silver, an average short diameter of the fibrous metal particles is equal to or smaller than 35 nm and an average long diameter is equal to or greater than 5 µm, and a content per unit area of fibrous metal particles of the fibrous metal particles-containing layer is equal to or greater than 10 $mg/m^2$.

As a method of manufacturing the heat insulating material for a window according to the second aspect of the invention, a method of directly applying a coating solution for a fibrous metal particles-containing layer containing fibrous metal particles onto a substrate having a thickness equal to or greater than 0.5 mm can be used.

<Properties>

The heat insulating material for a window of the invention has excellent visible light transmittance and warming properties.

Ultraviolet transmittance of the heat insulating material for a window of the invention is preferably equal to or smaller than 20%, from a viewpoint of improving a problem regarding a decrease in heat insulating properties over time when the heat insulating material for a window is exposed to exhaust gas in a case of using the heat insulating material for a window for vehicles which will be described later, or a problem regarding discoloration (yellowing) over time when the heat insulating material for a window is exposed to exhaust gas. The ultraviolet transmittance thereof is more preferably equal to or smaller than 10%, particularly preferably equal to or smaller than 5%, and more particularly preferably equal to or smaller than 2%.

A heat shielding coefficient of the heat insulating material for a window of the invention is preferably equal to or greater than 0.8 and more preferably equal to or greater than 0.9.

<Configuration>

The configuration of the heat insulating material for a window of the invention will be described.

Figure 4:
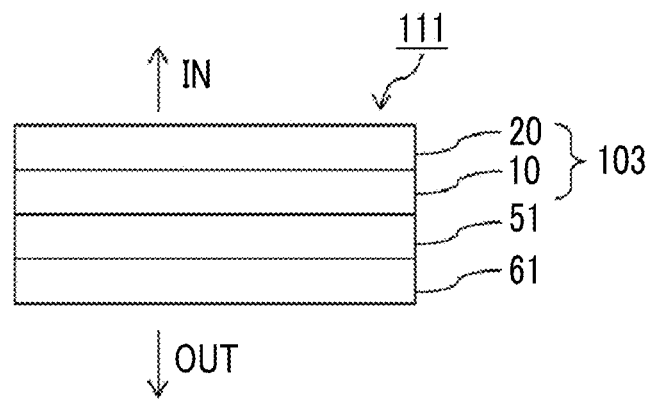
FIG. 4 is a schematic view showing a cross section of an example of a heat insulating material for a window of the invention.
Figure 5:
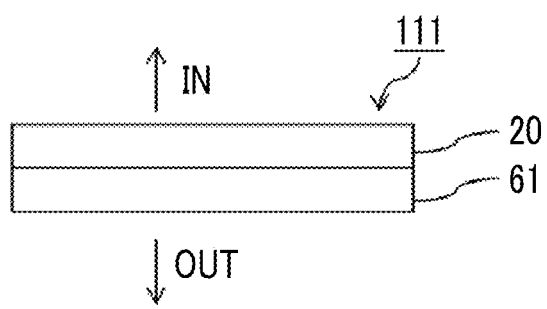
FIG. 5 is a schematic view showing a cross section of another example of the heat insulating material for a window of the invention.
Figure 6:
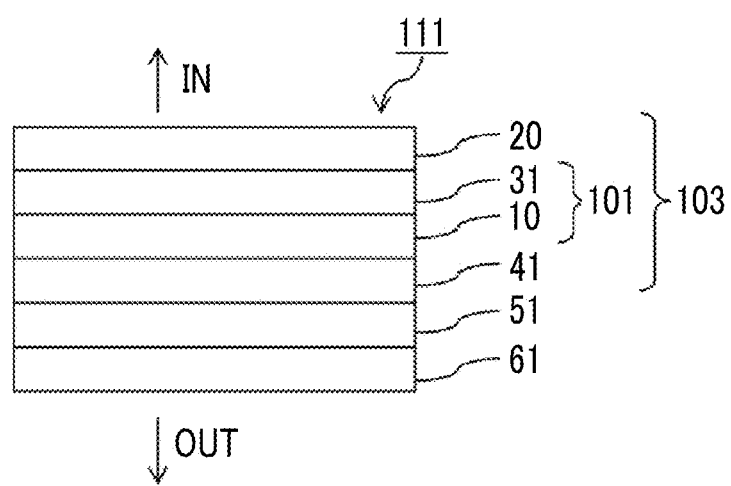
FIG. 6 is a schematic view showing a cross section of another example of the heat insulating material for a window of the invention.

FIGS. 4 to 6 showed schematic views showing cross sections of example of the heat insulating material for a window of the invention.

A heat insulating material for a window 111 of the invention shown in FIG. 4 shows the first aspect of the heat insulating material for a window of the invention and is a heat insulating material for a window in which the heat insulating window film 103 of the invention and a substrate 61 are bonded to each other by using a pressure sensitive adhesive material 51. The heat insulating window film 103 of the invention at least includes the flexible support 10 and the fibrous metal particles-containing layer 20 described above.

The heat insulating material for a window 111 of the invention shown in FIG. 5 shows the second aspect of the heat insulating material for a window of the invention and includes the substrate 61 and the fibrous metal particles-containing layer 20 containing fibrous metal particles. As described above, the heat insulating material for a window not including the flexible support is also included in the heat insulating material for a window of the invention.

The heat insulating material for a window 111 of the invention shown in FIG. 6 shows another example of the first aspect of the heat insulating material for a window of the invention and is a heat insulating material for a window which includes the heat insulating window film 103 of the invention including the fibrous metal particles-containing layer 20 laminated on one surface of the flexible support 10 through the adhesive layer 31, and the near infrared shielding layer 41 provided on the other surface of the flexible support 10, and in which the heat insulating window film 103 of the invention (near infrared shielding layer 41 side) and the substrate 61 are bonded to each other by using the pressure sensitive adhesive material 51.

In a case where the substrate 61 is a part of window (window glass), the fibrous metal particles-containing layer 20 is preferably disposed on the indoor side of the window (inner side, indoor side, side opposite to a sunlight incident side during daytime, IN side in FIGS. 4 to 6).

In the heat insulating material for a window of the invention, the fibrous metal particles-containing layer 20 is preferably disposed on the surface of the substrate 61 on a side opposite to the surface on a window side.

The heat insulating material for a window 111 of the invention preferably includes the pressure sensitive adhesive material 51 on the surface of the flexible support 10 on the window (substrate 61) side. In the heat insulating material for a window 111 of the invention, the substrate 61 and the pressure sensitive adhesive material 51 are preferably bonded to each other.

<Substrate>

The substrate is a substrate having a thickness equal to or greater than 0.5 mm, preferably a substrate having a thickness equal to or greater than 1 mm, and more preferably a substrate having a thickness of equal to or greater than 2 mm, from a viewpoint of preventing thermal conductivity caused by the thickness of the substrate to increase warming properties.

Generally, a plate-shaped or a sheet-shaped material is used as the substrate.

Examples of the substrate include transparent glass such as white plate glass, blue plate glass, or silica-coated blue plate glass; a synthetic resin such as polycarbonate, polyether sulfone, polyester, an acrylic resin, a vinyl chloride resin, an aromatic polyamide resin, polyamideimide, or polyimide; metal such as aluminum, copper, nickel, or stainless steel; ceramic; and a silicon wafer used in a semiconductor substrate. Among these, the substrate is preferably glass or a resin plate and more preferably glass.

The glass used as the substrate preferably has a smooth surface and is preferably float glass.

The heat insulating window material can be used as a heat insulating window glass or a heat insulating resin plate for a window, according to the type of the substrate.

<Pressure Sensitive Adhesive Layer>

The heat insulating material for a window of the invention preferably contains a pressure sensitive adhesive material.

The pressure sensitive adhesive material preferably contains an ultraviolet absorber from the following viewpoint.

It was found that, particularly, in a case of using the heat insulating window film or the heat insulating material for a window for vehicles, heat insulating properties of the heat insulating window film or the heat insulating material for a window using the fibrous metal particles-containing layer easily decrease over time. As a result of the intensive studies of the inventors, it was found that a decrease in heat insulating properties over time as described above is due to degradation of the fibrous metal particles due to the components contained in exhaust gas. Particularly, in a state of being irradiated with sunlight, the degradation of fibrous metal particles is significant, but, it was found that, by bonding the fibrous metal particles-containing layer to the substrate by using a pressure sensitive adhesive layer containing an ultraviolet absorber, it is possible to improve problems regarding a decrease in heat insulating properties over time when the film or the material is exposed to exhaust gas, in a case of being used for vehicles.

It was found that, particularly, in a case of using the heat insulating window film or the heat insulating material for a window for vehicles, discoloration (yellowing) over time easily occurs in the heat insulating window film or the heat insulating material for a window using the fibrous metal particles-containing layer, compared to a case of being used for buildings. As a result of the intensive studies of the inventors, it was found that discoloration (yellowing) over time described above is due to degradation of the fibrous metal particles due to the components contained in exhaust gas. Particularly, in a state of being irradiated with sunlight, the degradation of fibrous metal particles is significant, but, it was found that, by bonding the fibrous metal particles-containing layer to the substrate by using a pressure sensitive adhesive layer containing an ultraviolet absorber, it is possible to improve problems regarding a decrease in discoloration (yellowing) over time when the film or the material is exposed to exhaust gas, in a case of being used for vehicles. When the heat insulating window film or the heat insulating material for a window using the fibrous metal particles-containing layer is discolored, infrared reflection properties also decrease. Thus, when the discoloration is improved, an energy saving effect is improved.

When the ultraviolet absorber is on the outdoor side with respect to the fibrous metal particles-containing layer, it is easy to improve the problem regarding a decrease in heat insulating properties or the problem regarding discoloration (yellowing) over time, when the heat insulating window film or the heat insulating material is exposed to exhaust gas, in a case of being used for vehicles. Thus, the ultraviolet absorber is preferably included in the pressure sensitive adhesive material.

By combining the heat insulating window film or the heat insulating material for a window using the fibrous metal particles such as silver nanowires having no heat shielding properties and the pressure sensitive adhesive material containing the ultraviolet absorber with each other, it is possible to configure an energy-saving vehicle having stable heat insulating properties in a case of being exposed to exhaust gas.

With a combination of the heat insulating window film or the heat insulating material for a window using the fibrous metal particles such as silver nanowires having no heat shielding properties, the pressure sensitive adhesive material containing the ultraviolet absorber, and an electric car, it is possible to further prevent an influence of exhaust gas and to configure an energy-saving vehicle having more stable heat insulating properties in a case of being exposed to exhaust gas. Accordingly, by bonding the heat insulating window film or the heat insulating material for a window using the fibrous metal particles-containing layer by using the pressure sensitive adhesive material containing the ultraviolet absorber, power consumption of an electric car is improved over a long time. That is, by fitting the heat insulating window film or the heat insulating material for a window of the invention to a window of an electric car by using the pressure sensitive adhesive material containing the ultraviolet absorber, the mileage of the electric car during the winter is surprisingly increased.

A material capable of being used for forming the pressure sensitive adhesive material is not particularly limited and can be suitably selected according to the purpose. Examples thereof include a polyvinyl butyral resin, an acrylic resin, a styrene/acrylic resin, a urethane resin, a polyester resin, and silicone resin. These may be used alone or in combination of two or more kinds thereof. The pressure sensitive adhesive material formed of these materials can be formed by coating.

As the ultraviolet absorbing agent, a material disclosed in paragraphs "0041" to "0046" of JP2012-215811A can be preferably used and the description in this document is incorporated in this specification.

In addition, an antistatic agent, a lubricant, or an antiblocking agent may be added to the pressure sensitive adhesive material.

A thickness of the pressure sensitive adhesive material is preferably from 0.1 µm to 10 µm.

[Window]

A window of the invention is a window including a window glass and the heat insulating window film of the invention bonded to the window glass, or the heat insulating material for a window of the invention.

Components configuring glass or window glass are not particularly limited, and transparent glass such as white plate glass, blue plate glass, or silica-coated blue plate glass can be used as the glass or the window glass, for example. Meanwhile, in a case of a window including the heat insulating material for a window of the invention, the window of the invention may be a window using the resin plate described above as an example of the substrate, instead of the window glass.

When acquiring visible light transmittance of the heat insulating material for a window of the invention, the visible light transmittance can be measured by bonding the heat insulating window film of the invention to a blue plate glass having a thickness of 3 mm. As the blue plate glass having a thickness of 3 mm, a glass disclosed in JISA5759 is preferably used.

The heat insulating window film of the invention is preferably bonded to the inner side of the window, that is, the indoor side of the window glass. Since an effect exhibited by the heat insulating window film of the invention or the heat insulating material for a window of the invention is preferably a far infrared reflection effect, it is preferable not to laminate the material absorbing far infrared rays, from a viewpoint of increasing far infrared reflection efficiency. Since both a resin plate and glass absorb far infrared rays, it is preferable to provide the fibrous metal particles-containing layer on (substantially) the outermost surface on the indoor side.

In the heat insulating material for a window of the invention or the window of the invention, it is preferable that the fibrous metal particles-containing layer of the heat insulating window film of the invention is disposed on the surface of the flexible support on a side opposite to the surface of the window (glass or resin plate) side. In the invention, although the warming properties are dependent on the thickness of the fibrous metal particles-containing layer, a distance between the fibrous metal particles-containing layer and the outermost surface on the indoor side is preferably within 1 µm, from a viewpoint of increasing warming properties, and more preferably within 0.5 µm.

In addition, the fibrous metal particles-containing layer is preferably the outermost layer or the second outermost layer on the indoor side of the window, from a viewpoint of increasing warming properties, and more preferably the outermost layer on the indoor side of the window.

In the heat insulating material for a window of the invention or the window of the invention, it is preferable that the near infrared shielding layer is installed on a sunlight side as possible, because infrared rays to be incident to the room can be reflected in advance, and from this viewpoint, the pressure sensitive adhesive material is preferably laminated so that the near infrared shielding layer is installed on a sunlight incident side. Specifically, it is preferable that the pressure sensitive adhesive material is provided on the near infrared shielding layer or on the functional layer such as an overcoat layer provided on the near infrared shielding layer and the near infrared shielding layer is bonded to the window glass or the resin plate through this pressure sensitive adhesive material.

When bonding the heat insulating window film of the invention to the window of window glass or the resin plate, the heat insulating window film of the invention in which the pressure sensitive adhesive material is provided by coating or laminating is prepared, an aqueous solution containing a surfactant (mainly anionic) is sprayed to the window surface of the window glass or the resin plate and the surface of the pressure sensitive adhesive material in advance, and the heat insulating window film of the invention may be installed on the window of the window glass or the resin plate through the pressure sensitive adhesive material. The pressure sensitive adhesiveness of the pressure sensitive adhesive material decreases while moisture is evaporated, and accordingly, the position of the heat insulating window film of the invention can be adjusted on the surface of the window of the glass or the resin plate. After determining the bonding position of the heat insulating window film of the invention to the window of the window glass or the resin plate, the moisture remaining between the window glass and the heat insulating window film of the invention is swept out from the center to the edge of the glass by using a squeegee or the like, and accordingly, the heat insulating window film of the invention can be fixed to the surface of the window of the window glass or the resin plate. By doing so, the heat insulating window film of the invention can be installed on the window of the window glass or the resin plate.

<Building Material, Building, and Vehicles>

The usage of the heat insulating window film, the heat insulating material for a window, and the window of the invention is not particularly limited and can be suitably selected according to the purposes. For example, the heat insulating window film, the heat insulating material for a window, and the window are used for vehicles, for building materials or buildings, and for agriculture. Among these, the heat insulating window film, the heat insulating material for a window, and the window are preferably used in building materials, buildings, and vehicles, from a viewpoint of energy saving effects.

The building material is a building material including the heat insulating window film of the invention or the heat insulating material for a window of the invention.

The building of the invention is a building including the heat insulating window film of the invention, the heat insulating material for a window of the invention, the building material, or the window of the invention. Examples of the building include a house, an office building, and a warehouse.

The vehicle is a vehicle including the heat insulating window film of the invention, the heat insulating material for a window of the invention, or the window of the invention. Examples of the vehicle include a car (particularly, an electric car), a railway vehicle, and a ship.

EXAMPLES

Hereinafter, the examples of the invention will be described, but the invention is not limited to these examples. "%" and "part" as the content in the examples based on mass. In the examples, the "part" showing the blending amount shows "part by mass", unless otherwise noted.

[Measurement Method of Sizes of Fibrous Metal Particles]

In the following examples, the average short diameter (average diameter) and the average long diameter, and the coefficient of variation of the short diameter of the fibrous metal particles were measured as follows.

<Average Short Diameter (Average Diameter) and Average Long Diameter, and Long Diameter Size Distribution of Fibrous Metal Particles>

Short diameters (short axis lengths, diameters) and long diameters (long axis lengths) of 300 fibrous metal particles randomly selected from nano-metal fibrous particles which were enlarged and observed by using a transmission electron microscope (TEM; manufactured by JEOL, Ltd., JEM-2000FX) were measured, and an average short diameter (average short axis length, average diameter) and an average long diameter (average long axis length) of the fibrous metal particles were acquired from the average value thereof.

The number of fibrous metal particles having a long diameter equal to or greater than 15 µm among 300 fibrous metal particles, the long diameters of which are measured, in the measurement method of the average long diameter, was counted and the number proportion of the particles having a long diameter equal to or greater than 15 µm is acquired.

<Coefficient of Variation of Short Diameter (Short Axis Length, Diameter) of Fibrous Metal Particles>

The short diameters (short axis lengths, diameters) of 300 fibrous metal particles randomly selected from the transmission electron microscope (TEM) image were measured and a standard deviation and an average value of 300 fibrous metal particles were calculated to acquire a coefficient of variation. The coefficient of variation was acquired by dividing the value of the standard deviation by the average value.

The separation of the fibrous metal particles when acquiring the proportion of the fibrous metal particles was performed by using a membrane filter (manufactured by Millipore Corporation, FALP 02500, hole diameter of 1.0 μm).

[Dispersion Liquid Preparation Method 1-A]
<Preparation of Silver Nanowire Dispersion Liquid (1) Using Heat Insulating Window Film Sample 107>

First, the following liquid additives A, B, C, and D were prepared in advance.

(Liquid Additive A)

60 mg of stearyltrimethylammonium chloride, 6.0 g of stearyltrimethylammonium hydroxide 10% aqueous solution, and 3.0 g of glucose were dissolved in 120.0 g of distilled water to obtain a reaction solution A-1. 55 mg of silver nitrate powder was dissolved in 2.0 g of distilled water to obtain aqueous silver nitride A-1. The reaction solution A-1 was maintained at 25° C. and the aqueous silver nitride A-1 was added thereto while vigorously stirring. The mixture was vigorously stirred for 180 minutes after the adding of the aqueous silver nitride A-1, to obtain a liquid additive A.

(Liquid Additive B)

25.6 g of silver nitrate powder was dissolved in 958 g of distilled water to obtain a liquid additive B.

(Liquid Additive C)

75 g of 25% ammonia water was mixed with 925 g of distilled water to obtain a liquid additive C.

(Liquid Additive D)

400 g of polyvinyl pyrrolidone (K15) was dissolved in 1.6 kg of distilled water to obtain a liquid additive D.

Next, a silver nanowire dispersion liquid (1) was prepared as follows.

1.30 g of stearyltrimethylammonium bromide powder, 33.1 g of sodium bromide powder, 1,000 g of glucose powder, and 115.0 g of nitric acid (1 mol/L) were dissolved in 12.7 kg of distilled water at 80° C. The solution was maintained at 80° C., and the liquid additive A was added at an addition rate of 250 cm³/min, the liquid additive B was added at an addition rate of 500 cm³/min, and the liquid additive C was added at an addition rate of 500 cm³/min, while stirring the mixture at 500 rpm. The stirring speed was set as 200 rounds per minute (rpm) and the mixture was heated at 80° C. The heating and stirring were continued for 130 minutes after setting the stirring speed at 200 rpm, and then, the mixture was cooled at 25° C. The stirring speed was changed to 500 rpm and the liquid additive D was added at 500 cm³/min. The solution was set a preparation solution 101.

Next, while vigorously stirring 1-propanol, the preparation solution 101 was added thereto so that the mixed ratio thereof becomes 1:1 in a volume ratio. The stirring was performed for 3 minutes and the obtained solution was set as a preparation solution 102.

The ultrafiltration was performed as follows by using an ultrafiltration module having molecular weight cutoff of 150,000. After concentration of the preparation solution 102 to 4 times, the adding and the concentration of a mixed solution of distilled water and 1-propanol (volume ratio of 1:1) were repeated so that conductivity of a filtrate finally becomes 500 μS/cm, to obtain a silver nanowire dispersion liquid (1) having a metal content of 0.45%.

Regarding silver nanowires of the obtained silver nanowire dispersion liquid (1), the average short diameter, the average long diameter, the coefficient of variation of the short diameter of the silver nanowires, and the average aspect ratio were measured as follows. As a result thereof, the average short diameter was 24 nm, the average long diameter was 10 μm, the coefficient of variation of the short diameter of the silver nanowires was 15.0%, and the average aspect ratio was 440. This silver nanowire dispersion liquid (1) is used as a silver nanowire dispersion liquid in a heat insulating window film sample 107 which will be described later.

<Preparation of Silver Nanowire Dispersion Liquid Using Heat Insulating Window Film Samples 101 to 106, and 108 to 110>

The average short diameter and the average long diameter of the fibrous metal particles (silver nanowires) were adjusted as shown in Table 1 which will be described later by a preparation method which is the same as the preparation of the silver nanowire dispersion liquid (1), except for the amount of the liquid additive A and temperature and time after adding the liquid additive C, at the time of preparing the preparation solution 101, and silver nanowire dispersions using each of heat insulating window film samples 101 to 106 and 108 to 110 which will be described later were prepared. In Table 1 which will be described later, the dispersion liquid preparation method (1-A) shows a method of using the silver nanowire dispersion liquid obtained by using the dispersion liquid preparation method 1-A described above and having adjusted average short diameter and average long diameter was used.

[Dispersion Liquid Preparation Method 1-B]

Reference Example

Preparation of Silver Nanowire Dispersion Liquid (3)

20 g of silver nitrate powder was dissolved in 370 g of propylene glycol to prepare a silver nitrate solution 301.

72.0 g of polyvinylpyrrolidone (molecular weight of 55,000) was added to 4.45 kg of propylene glycol and the mixture was heated to 90° C. while causing nitrogen gas to pass through a gas phase portion of a vessel. The solution was set as a reaction solution 301.

While causing nitrogen gas to keep passing, 2.50 g of the silver nitrate solution 301 to a reaction solution 301 vigorously stirred, and the mixture was heated and stirred for 1 minute. A solution obtained by dissolving 11.8 g of tetrabutyl ammonium chloride to 100 g of propylene glycol was added to the solution described above, and the obtained solution was set as a reaction solution 302.

200 g of the silver nitrate solution 301 was added to the reaction solution 302 maintained at 93° C. and stirred at a stirring speed of 500 rpm at an addition rate of 50 cm³/min. The stirring speed was decreased to 100 rpm, the passing of nitrogen gas was stopped, and heating and stirring were performed for 18 hours. 220 g of the silver nitrate solution 301 was added to the solution maintained at 90° C. and stirred at a stirring speed of 100 rpm, at an addition rate of 0.5 cm³/min, and the heating and stirring were continued for 3 hours after the completion of the adding. The stirring speed was changed to 500 rpm, 1.0 kg of distilled water was added thereto, and cooled to 25° C., to prepare a preparation solution 301.

The ultrafiltration was performed as follows by using an ultrafiltration module having molecular weight cutoff of 150,000. The adding and the concentration of a mixed solution of distilled water and 1-propanol (volume ratio of 1:1) were repeated so that conductivity of a filtrate finally becomes equal to or smaller than 500 µS/cm, to obtain a silver nanowire dispersion Liquid (3) having a metal content of 0.45%.

Regarding silver nanowires of the obtained silver nanowire dispersion liquid (3), the average short diameter, the average long diameter, the coefficient of variation of the short diameter of the silver nanowires, and the average aspect ratio were measured as follows. As a result thereof, the average short diameter was 34.5 nm, the average long diameter was 10.2 µm, the coefficient of variation of the short diameter of the silver nanowires was 19.9%, and the average aspect ratio was 300. This silver nanowire dispersion liquid (3) was not used in Examples and Comparative Examples which will be described later.

<Preparation of Silver Nanowire Dispersion Liquid Using Heat Insulating Window Film Samples 111 and 112>

The average short diameter and the average long diameter of the fibrous metal particles (silver nanowires) were adjusted as shown in Table 1 which will be described later by a preparation method which is the same as the preparation of the silver nanowire dispersion liquid (3), except for the adding speed, and the temperature and time after adding the silver nitrate solution 301, at the time of preparing the preparation solution 301, and silver nanowire dispersions using each of heat insulating window film samples 111 and 112 which will be described later were prepared. In Table 1 which will be described later, the dispersion liquid preparation method (1-B) shows a method of using the silver nanowire dispersion liquid obtained by using the dispersion liquid preparation method 1-B described above and having adjusted average short diameter and average long diameter was used.

[Dispersion Liquid Preparation Method 1-C]

Polyaniline powder was pulverized with a hammer mill and further pulverized with a beads mill to have an average particle size of 80 nm. The pulverized polyaniline powder was doped with 10-camphor sulfonic acid, to obtain polyaniline particles having conductivity of $10^{-2}$ S/mm. The obtained polyaniline particles were dispersed in the solvent of a mixed solution of distilled water and 1-propanol (volume ratio of 1:1) to obtain a polyaniline particle dispersion liquid (1-C).

The polyaniline particle dispersion liquid (1-C) was used in the heat insulating window film samples 116 and 117, and a dispersion liquid preparation method of the heat insulating window film samples 116 and 117 was shown as (1-C) in Table 1 which will be described later.

[Dispersion Liquid Preparation Method 1-D]

1-propanol was added to a poly(3,4-ethylene dioxythiophene)/poly(styrene sulfonic acid) (hereinafter, also referred to as PEDOT/PSS) aqueous solution so that the volume ratio of water/1-propanol becomes 1:1, to obtain a PEDOT/PSS dispersion liquid (1-D).

The PEDOT/PSS dispersion liquid (1-D) was used in the heat insulating window film sample 118, and a dispersion liquid preparation method of the heat insulating window film sample 118 was shown as (1-D) in Table 1 which will be described later.

Preparation Example 2-A of Flexible Support

<Preparation of PET Substrate 101>

A solution for adhesion 1 was prepared with the following combination.

(Solution for Adhesion 1)
TAKELAC WS-4000: 5.0 parts
(polyurethane for coating, concentration of solid contents of 30%, manufactured by Mitsui Chemicals, Inc.)
Surfactant: 0.3 parts
(NAROACTY HN-100, manufactured by Sanyo Chemical Industries)
Surfactant: 0.3 parts
(SANDET BL, concentration of solid contents of 43%, manufactured by Sanyo Chemical Industries)
Water: 94.4 parts Corona discharge treatment was performed with respect to both surfaces of a PET film having a thickness of 125 µm, the solution for adhesion 1 was applied to both surfaces subjected to the corona discharge treatment and dried at 120° C. for 2 minutes, to form a first adhesive layer having a thickness of 0.11 µm on both surfaces of the PET film.

A solution for adhesion 2 was prepared with the following combination.

(Solution for Adhesion 2)
Tetraethoxysilane: 5.0 parts
(KBE-04, manufactured by Shin-Etsu Chemical Co., Ltd.)
3-glycidoxypropyltrimethoxysilane: 3.2 parts
(KBM-403, manufactured by Shin-Etsu Chemical Co., Ltd.)
2-(3,4-epoxycyclohexyl)ethyl trimethoxysilane: 1.8 parts
(KBM-303, manufactured by Shin-Etsu Chemical Co., Ltd.)
Acetic acid aqueous solution (acetic acid concentration=0.05%, pH (power of Hydrogen)=5.2): 10.0 parts
Hardener: 0.8 parts
(boric acid, manufactured by Wako Pure Chemical Industries, Ltd.)
Colloidal silica: 60.0 parts
(SNOWTEX O, average particle diameter of 10 nm to 20 nm, concentration of solid contents of 20%, pH=2.6, manufactured by Nissan Chemical Industries, Ltd.)
Surfactant: 0.2 parts
(NAROACTY HN-100, manufactured by Sanyo Chemical Industries)
Surfactant: 0.2 parts
(SANDET BL, concentration of solid contents of 43%, manufactured by Sanyo Chemical Industries)

A preparation method of the solution for adhesion 2 will be described later in detail.

While vigorously stirring the acetic acid aqueous solution, 3-glycidoxypropyltrimethoxysilane was added dropwise into this acetic acid aqueous solution for 3 minutes. Next, 2-(3,4-epoxycyclohexyl) ethyl trimethoxysilane was added for 3 minutes while strongly stirring the acetic acid aqueous solution. Then, tetraethoxysilane was added for 5 minutes while strongly stirring the acetic acid aqueous solution, and stirring was continued for 2 hours. Next, colloidal silica, the hardener, and the surfactant were sequentially added to prepare the solution for adhesion 2.

The surface of the first adhesive layer described above formed on both surfaces of the PET film was subjected to corona discharge treatment, the solution for adhesion 2 described above was applied to both surfaces thereof by a bar coating method and heated and dried at 170° C. for 1 minute, and a second adhesive layer having a thickness of 0.5 µm was formed to obtain a PET substrate 101.

Preparation Example 2-B of Flexible Support

<Preparation of PET Substrate 102>

After performing corona discharge treatment for the surface of a PET film (thickness of 50 µm), 0.02% of (N-(β-amino ethyl)-γ-aminopropyl trimethoxysilane aqueous solution was applied by a bar boating method so that an application amount becomes 8.8 mg/m$^2$, and dried at 100° C. for 1 minute, to obtain a surface-treated PET substrate 102.

Examples 104 to 112, and Comparative Examples 101 to 103

<Preparation of Heat Insulating Window Film Sample 107>

A solution of an alkoxide compound (tetraethoxysilane which is an alkoxide compound of an element (b) selected from the group consisting of Si, Ti, Zr, and Al) having the following composition was stirred at 60° C. for 1 hour and a uniform state was confirmed, and a sol-gel solution was obtained. When a weight average molecular weight (MW) of the obtained sol-gel solution was measured by GPC (polystyrene conversion), the Mw was 4,400.

(Solution of Alkoxide Compound)
Tetraethoxysilane: 5.0 parts
(KBE-04, manufactured by Shin-Etsu Chemical Co., Ltd.)
1% Acetic acid aqueous solution: 11.0 parts
Distilled water: 4.0 parts 2.24 parts of the obtained sol-gel solution and 17.76 parts of the silver nanowire dispersion liquid (1) obtained by the dispersion liquid preparation method (1-A) were mixed with each other and diluted using the distilled water and 1-propanol, to obtain a sol-gel coating solution. A solvent ratio of the obtained coating solution was distilled water:1-propanol=60:40.

The PET substrate 102 prepared by the method described above was used as the flexible support, and the sol-gel coating solution was applied to one surface of the PET substrate 102 so that that the silver amount is 0.015 g/m$^2$ and the total solid content coating amount is 0.120 g/m$^2$ by using a bar coating method. After that, the sol-gel coating solution was dried at 100° C. for 1 minute to allow a sol-gel reaction and a heat insulating window film sample 107 was formed. A mass ratio of tetraethoxysilane (alkoxide compound)/silver nanowires of the fibrous metal particles-containing layer was 7/1.

The heat insulating window film sample 107 obtained as described above was set as a heat insulating window film of Example 107.

An electron micrograph which is for observing the cross section of the fibrous metal particles-containing layer of the heat insulating window film of Example 107 with a scanning transmission electron microscope (product name: HD-2300, applying voltage: 200 kV) manufactured by Hitachi, Ltd. and which shows the state of the arrangement of the fibrous metal particles is shown in FIG. 7.

<Preparation of Heat Insulating Window Film Samples 101 to 106, and 108 to 112>

Heat insulating window film samples 101 to 106 and 108 to 112 were prepared in the same manner as in preparation of the heat insulating window film sample 107, except for changing the average short diameter and the average long diameter of silver nanowires and the content of the fibrous metal particles per unit area of the heat insulating window film as shown in Table 1 below.

The heat insulating window film samples 101 to 106 and 108 to 112 obtained as described above were set as heat insulating window films of Comparative Examples 101 to 103 and Examples 104 to 106 and 108 to 112.

Comparative Examples 113 and 114

<Preparation of Heat Insulating Window Film Samples 113 and 114>

Silver was vapor-deposited on the second adhesive layer on one surface of the PET substrate 101 obtained by using the method described above by using vacuum vapor deposition equipment so that the silver amount becomes 20 mg/m$^2$, to obtain a heat insulating window film sample 113. At this time, the average short diameter and the average long diameter of the silver particles were 25 nm and spherical metal particles are obtained.

In the preparation of the heat insulating window film sample 113, when vapor deposition was performed so that the silver amount becomes 250 mg/m$^2$, the silver particles had continuous film shape and a heat insulating window film sample 114 was obtained.

The heat insulating window film samples 113 and 114 obtained as described above were set as heat insulating window films of Comparative Examples 113 and 114.

Comparative Example 115

<Preparation of Heat Insulating Window Film Sample 115>

The PET substrate 102 which is the flexible support was used as a heat insulating window film sample 115. The heat insulating window film sample 115 was set as a heat insulating window film of Comparative Example 115.

Comparative Examples 116 to 118

<Preparation of Preparation of Heat Insulating Window Film Samples 116 to 118>

The polyaniline particle dispersion liquid (1-C) was applied onto the PET substrate 102 used as the flexible support so as to obtain the particle content per unit area shown in Table 1 below, and heat insulating window film samples 116 and 117 were prepared.

The PEDOT/PSS dispersion liquid (1-D) was applied onto the PET substrate 102 used as the flexible support so as to obtain the particle content per unit area shown in Table 1 below, and a heat insulating window film sample 118 was prepared.

The heat insulating window film samples 116 to 118 obtained as described above were set as heat insulating window films of Comparative Examples 116 to 118.

[Evaluation]
<Visible Light Transmittance>

A pressure sensitive adhesive material was bonded to the heat insulating window films of Examples and Comparative Examples by using the following method to form a pressure sensitive adhesive layer. PANACLEAN PD-S1 (pressure sensitive adhesive layer thickness of 25 µm) manufactured by PANAC Corporation was used as the pressure sensitive adhesive material, a peelable separator (silicone coat PET) of the pressure sensitive adhesive material was peeled off, and the pressure sensitive adhesive material was bonded to the surface of the flexible support on a side opposite to the fibrous conductive particles-containing layer. The other heavy peelable separator (silicone coat PET) of the pressure sensitive adhesive material PD-S1 was peeled off from the pressure sensitive adhesive layer formed by the method described above, the pressure sensitive adhesive layer was bonded to a plate glass (thickness of plate glass: blue plate glass having a thickness of 3 mm) which was soda-lime silicate by using a 0.5 mass % diluent of REAL PERFECT (manufactured by Lintec Corporation) which was film processing liquid, and a measurement sample for optical properties was prepared.

Transmission spectra of measurement samples for optical properties were measured by using an ultraviolet-visible near infrared spectroscope (manufactured by JASCO Corporation, V-670) and visible light transmittance was obtained based on JIS R 3106.

The visible light transmittance practically preferably exceeds 75%, and is more preferably equal to or greater than 80% and higher visible light transmittance is preferable.

The obtained results were shown in Table 1 below.

<Warming Properties>

Warming properties described below were evaluated as sensory evaluation of heat insulating properties when the heat insulating window film is bonded to a window.

In the preparation of the heat insulating window film sample 113, vapor deposition was performed until the silver amount becomes 1,100 mg/m$^2$, the silver particles had continuous film shape and a silver deposited PET sample was obtained.

A cylinder obtained by bonding the heat insulating window film of Examples and Comparative Examples (or heat insulating material for a window obtained by bonding the heat insulating window film to the substrate in the evaluation of warming properties of the heat insulating material for a window which will be described later) or the silver-deposited PET sample to the inner side of total four surfaces of two sets of the surfaces facing each other of a cube-shaped frame having one side of 15 cm was prepared.

A subject put a right hand or a left hand in the obtained cylinder and compared warmth of a hand after 20 seconds after putting the hand in the cylinder, and the order was determined by the following method. Points are applied for 10-stage evaluation by applying the point "1" to a case of using the PET substrate 101 to which the nanowire dispersion liquid using the heat insulating window film sample of Comparative Example 115 is not applied, and applying the point "10" to a case of using the silver-deposited PET sample having visible light transmittance of 0% (silver deposited amount of 1,100 mg/m$^2$) prepared as described above. The points are applied to the level of warmth of the hand put into the cylinder using the heat insulating window film of Examples and Comparative Examples for sensory evaluation. The sensory evaluations of 10 subjects are averaged and an average value thereof was set as an evaluation result of warming properties.

In the evaluation regarding warming properties, 4 point or more is practically preferable, and higher points are more preferable.

The obtained results are shown in Table 1 below

TABLE 1

| Heat insulating window film sample | Dispersion preparation method | Particles Particle shape | Average short diameter nm | Average long diameter μm | Particle content per unit area mg/m$^2$ | Evaluation Visible light transmittance % | Warming properties |
|---|---|---|---|---|---|---|---|
| Comparative Example 101 | 1-A | Fibrous metal | 52 | 10 | 20 | 84 | 2 |
| Comparative Example 102 | 1-A | Fibrous metal | 35 | 2 | 20 | 82 | 2 |
| Comparative Example 103 | 1-A | Fibrous metal | 35 | 10 | 8 | 84 | 2 |
| Example 104 | 1-A | Fibrous metal | 35 | 10 | 10 | 82 | 4 |
| Example 105 | 1-A | Fibrous metal | 35 | 5 | 20 | 82 | 5 |
| Example 106 | 1-A | Fibrous metal | 35 | 10 | 20 | 80 | 6 |
| Example 107 | 1-A | Fibrous metal | 24 | 10 | 30 | 81 | 7 |
| Example 108 | 1-A | Fibrous metal | 20 | 10 | 30 | 80 | 7 |
| Example 109 | 1-A | Fibrous metal | 20 | 20 | 30 | 80 | 8 |
| Example 110 | 1-A | Fibrous metal | 15 | 5 | 30 | 80 | 8 |
| Example 111 | 1-B | Fibrous metal | 35 | 25 | 20 | 82 | 6 |
| Example 112 | 1-B | Fibrous metal | 30 | 20 | 20 | 82 | 6 |
| Comparative Example 113 | Vapor deposition | Spherical metal | 25 | 0.025 | 20 | 80 | 1 |
| Comparative Example 114 | Vapor deposition | Thin layer-shaped metal | — | — | 250 | 75 | 8 |
| Comparative Example 115 | None | None | — | — | — | 75 | 1 |
| Comparative Example 116 | 1-C | Spherical polyaniline | 80 | 0.08 | 400 | 80 | 1 |

TABLE 1-continued

|  | Heat insulating window film | | | | | | |
|---|---|---|---|---|---|---|---|
|  |  |  | Particles | | Particle | Evaluation | |
| Heat insulating window film sample | Dispersion preparation method | Particle shape | Average short diameter nm | Average long diameter μm | content per unit area mg/m$^2$ | Visible light transmittance % | Warming properties |
| Comparative Example 117 | 1-C | Spherical polyaniline | 80 | 0.08 | 2000 | 15 | 3 |
| Comparative Example 118 | 1-D | PEDOT/PSS | — | — | 100 | 80 | 3 |

As shown in Table 1, from Comparative Example 101, it was found that the heat insulating window film sample 101 having the average short diameter of the fibrous metal particles longer than the upper limit value regulated in the invention had low warming properties.

From Comparative Example 102, it was found that the heat insulating window film sample 102 having the average long diameter of the fibrous metal particles shorter than the lower limit value regulated in the invention had low warming properties.

From Comparative Example 103, it was found that the heat insulating window film sample 103 having the content of fibrous metal particles per unit area smaller than the lower limit value regulated in the invention had low warming properties.

From Comparative Example 113, it was found that the heat insulating window film sample 113 in which metal particles which are not fibrous are formed by vapor deposition, had low warming properties.

From Comparative Example 114, it was found that the heat insulating window film sample 114 in which, not the fibrous metal particles-containing layer, but a silver thin film was formed, had high warming properties but had low visible light transmittance, and thus, the heat insulating window film sample was not preferred.

From Comparative Example 115, it was found that the heat insulating window film sample 115 in which the fibrous metal particles-containing layer is not formed, had low warming properties and low visible light transmittance, and thus, the heat insulating window film sample was not preferred.

From Comparative Examples 116 to 118, it was found that the heat insulating window film samples 116 to 118 using an organic compound-based infrared absorbing material had low warming properties, and thus, the heat insulating window film samples were not preferred.

Meanwhile, from Examples 104 to 112, it was found that the heat insulating window films having high visible light transmittance and high warming properties were obtained according to the invention. Particularly, even when the application amount of the heat insulating window film sample having a smaller average short diameter was increased, visible light transmittance was not decreased and high warming properties are obtained, and accordingly, the heat insulating window film samples was preferred. It was found that, regarding the dispersion liquid preparation method, the aspect represented by the dispersion liquid preparation method 1-A is preferable than the aspect represented by a dispersion liquid preparation method 1-B, from a viewpoint of easily synthesizing fibrous metal particles such as finer (small short diameter) metal nanowires.

Examples 201 to 204

<Preparation of Heat Insulating Window Film Samples>

Four kinds of heat insulating window film samples were prepared in the same manner as in the preparation of the heat insulating window film sample 107 of Example 107, except for using four kinds of liquid additives in which 0.1 mol % or 0.5 mol % of silver nitrate of the liquid additive B is substituted with chloroauric acid (tetrahydrate) or copper sulfate (pentahydrate), instead of the liquid additive B used at the time of preparation of the silver nanowires (1).

The four kinds of heat insulating window film samples obtained were set as heat insulating window films of Examples 201 to 204.

<Evaluation of Heat Insulating Window Films>

Regarding the heat insulating window films of Examples 201 to 204, the evaluation was performed in the same manner as in Example 107.

As a result thereof, it was found that the heat insulating window films of Examples 201 to 204 had the same properties as in a case of Example 107 and were heat insulating window films having high visible light transmittance and high warming properties. The shape of silver nanowires obtained in the preparation of the heat insulating window films of Examples 201 to 204 was substantially the same as the shape of silver nanowires obtained in the preparation of the heat insulating window film of Example 107.

As described above, it was found that, even in a case of using fibrous particles of an alloy of silver as fibrous metal particles, the heat insulating window film having high visible light transmittance and high warming properties was obtained, in the same manner as in a case of using the silver fibrous particles.

Examples 301 to 304 and Comparative Examples 305 to 308

<Preparation of Heat Insulating Material for Window>

In order to compare warming properties in a case where the heat insulating window films of the invention were bonded to windows of buildings or vehicles, the heat insulating window film sample of Example 107 and the heat insulating window film sample of Comparative Example 113 were respectively bonded to a glass substrate having a thickness shown in Table 2 below, heat insulating materials for a window of Examples 301 to 304 and Comparative Examples 305 to 308 were prepared, and warming properties thereof were evaluated.

The preparing method of the heat insulating material for a window is shown below in detail.

A pressure sensitive adhesive material was bonded to the surface of the fibrous metal particles-containing layer of the heat insulating window film sample of Example 107 or Comparative Example 113. PD-S1 (manufactured by PANAC Corporation) was used as the pressure sensitive adhesive material, a peelable separator was peeled off from one surface of PD-S1 and the surface was bonded to the fibrous metal particles-containing layer, and a peelable separator was peeled off from the other surface of PD-S1 and the surface was bonded to a float glass having a thickness shown in Table 2 below.

<Evaluation of Warming Properties>

The sensory evaluation of warming properties of the heat insulating material for a window obtained in the same manner as in Example 107, except for bonding respective heat insulating materials for a window of Examples 301 to 304 and Comparative Examples 305 to 308, instead of bonding heat insulating window film of Example 107 to the inner side of total four surfaces of two sets of the surfaces facing each other of a cube-shaped frame having one side of 15 cm, was performed, and effects of the glass bonding and the glass thickness were compared with each other.

The obtained results were shown in Table 2 below.

Even in a case where the heat insulating material for a window in which a dispersion liquid of fibrous metal particles is directly applied to a glass was separately prepared, substantially the same properties as the heat insulating materials for a window of Examples 301 to 304 in which the heat insulating window film obtained by applying a dispersion liquid of fibrous metal particles to a flexible support was bonded to a glass by using a pressure sensitive adhesive material were obtained.

Examples 401 to 404 and Comparative Examples 405 to 408

<Preparation of Heat Insulating Material for Window>

Heat insulating materials for a window of Examples 401 to 404 and Comparative Examples 405 to 408 were prepared in the same manner as in Examples 301 to 304 and Comparative Examples 305 to 308, except for changing the float glass to an acrylic board which is a resin plate.

<Evaluation of Heat Insulating Window Film>

The evaluation of obtained heat insulating materials for a window of Examples 401 to 404 and Comparative Examples 405 to 408 was performed in the same manner as in

TABLE 2

| | Heat insulating material for window | | | | | | | | |
|---|---|---|---|---|---|---|---|---|---|
| | Heat insulating window film | | | | | | | | Evaluative of |
| Sample | | | | Particles | | | | | heat insulating |
| of heat insulating material for window | Heat insulating window film sample | Dispersion preparation method | Particle shape | Average short diameter nm | Average long diameter μm | Particle content per unit area mg/m$^2$ | Visible light transmittance % | Substrate Glass thickness mm | material for window Warming properties |
| Example 301 | 107 | 1-A | Fibrous metal | 24 | 10 | 30 | 81 | 1 | 7 |
| Example 302 | 107 | 1-A | Fibrous metal | 24 | 10 | 30 | 81 | 2 | 9 |
| Example 303 | 107 | 1-A | Fibrous metal | 24 | 10 | 30 | 81 | 3 | 9 |
| Example 304 | 107 | 1-A | Fibrous metal | 24 | 10 | 30 | 81 | 5 | 9 |
| Comparative Example 305 | 113 | Vapor deposition | Spherical metal | 25 | 0.025 | 20 | 80 | 1 | 1 |
| Comparative Example 306 | 113 | Vapor deposition | Spherical metal | 25 | 0.025 | 20 | 80 | 2 | 1 |
| Comparative Example 307 | 113 | Vapor deposition | Spherical metal | 25 | 0.025 | 20 | 80 | 3 | 1 |
| Comparative Example 308 | 113 | Vapor deposition | Spherical metal | 25 | 0.025 | 20 | 80 | 5 | 1 |

From Table 2, it was found that the heat insulating material for a window of the invention had high visible light transmittance and high warming properties. Particularly, the heat insulating materials for a window of Examples 302 to 304 in which the heat insulating window film of Example 107 is bonded to a glass having a thickness equal to or greater than 2 mm have high warming properties than that of the heat insulating material for a window of Example 301 in which the heat insulating window film of Example 107 is bonded to a glass having a thickness of 1 mm and they are preferred aspect of the invention.

Meanwhile, the effect of improvement of warming properties was not observed in the heat insulating materials for a window of Comparative Examples 305 to 308 using heat insulating window film of Comparative Example 113 in which metal particles which are not fibrous are formed by vapor deposition.

Examples 301 to 304 and Comparative Examples 305 to 308. As a result, the same effects as in Examples 301 to 304 and Comparative Examples 305 to 308 were obtained.

Accordingly, it was found that heat insulating materials for a window of Examples 401 to 404 using a resin plate as a substrate had high visible light transmittance and high warming properties. Even in a case of using a transparent resin plate other than glass as the substrate of the heat insulating material for a window, it is preferable to use a substrate having a thickness equal to or greater than 2 mm.

Even in a case where the heat insulating material for a window in which a dispersion liquid of fibrous metal particles is directly applied to a resin plate was separately prepared, substantially the same properties as the heat insulating materials for a window of Examples 401 to 404 in which the heat insulating window film obtained by applying a dispersion liquid of fibrous metal particles to a flexible support was bonded to a resin plate by using a pressure sensitive adhesive material were obtained.

Examples 501 to 509

<Preparation of Heat Insulating Material for Window of Examples 501 to 503>

Heat insulating materials for a window of Examples 501 to 503 were prepared in the same manner as in the preparation of the heat insulating window film sample of Example 302, except for using three kinds of pressure sensitive adhesive materials obtained by including 2-(5-chloro-2-benzotriazolyl)-6-tert-butyl-p-cresol to a pressure sensitive adhesive material so that ultraviolet transmittance (400 nm) becomes value shown in Table 3 below, instead of the pressure sensitive adhesive material PD-S1.

<Preparation of Heat Insulating Material for Window of Examples 504 to 509>

Heat insulating materials for a window of Examples 504 to 509 were prepared in the same manner as in the preparation of the heat insulating materials for a window of Examples 501 to 503, except for using the heat insulating window film formed by applying the silver plated particle layer having an adjusted shade factor in a state of being bonded to a glass substrate to have values shown in Table 3 below, by referring to a silver plated particle layer disclosed in Example 5 of JP2014-70255A, to the side opposite to the fibrous metal particles-containing layer of the heat insulating window film of Example 107.

<Evaluation of Heat Insulating Window Film>
(Visible Light Transmittance)

The visible light transmittance of the heat insulating window film formed by further applying various silver plated particle layer to the heat insulating window film of Example 107, prepared in Examples 504 to 509 was measured in the same manner as in Example 107. The results thereof were shown in Table 3 below.

<Evaluation of Heat Insulating Material for Window>
(Ultraviolet Transmittance)

The ultraviolet transmittance of the obtained heat insulating materials for a window of Examples 501 to 509 at 200 nm to 380 nm was measured by using an ultraviolet-visible near infrared spectroscope (manufactured by JASCO Corporation, V-670), the transmittance of each wavelength was averaged, and this value was defined as the ultraviolet transmittance of this specification.

(Shade Factor)

Shade factors of the obtained heat insulating materials for a window of Examples 501 to 509 were calculated from the transmittance at 300 nm to 2500 nm measured by using an ultraviolet-visible near infrared spectroscope (manufactured by JASCO Corporation, V-670), based on a method disclosed in JIS A5759.

(Warming Properties (Before Exposure))

Warming properties of the obtained heat insulating materials for a window of Examples 501 to 509 were evaluated in the same manner as in Example 107.

The results thereof were shown in Table 3 below.

(Warming Properties (After Exposure))

Various samples of heat insulating materials for a window was sealed in a desiccator filled with nitrogen oxide mixed air (nitrogen oxide concentration of 800 ppm (parts per million)), as a substitution of exhaust gas exposure, by setting a direction of a glass substrate to be towards a light source side, and irradiation of a xenon lamp at 100 W/m$^2$ was performed for 500 hours.

The warming properties of the obtained exposed samples as described above were evaluated in the same manner as in Example 107.

The results thereof were shown in Table 3 below.

(Yellowing After Exposure)

The yellowing of the exposed samples obtained in the evaluation of the warming properties (after exposure) was visually evaluated.

The results thereof were shown in Table 3 below.

TABLE 3

| | Heat insulating material for window | | | | | | | | | | |
|---|---|---|---|---|---|---|---|---|---|---|---|
| | Heat insulating window film | | | | Pressure sensitive adhesive | | Evaluation of heat insulating material for window | | | | |
| Sample of heat insulating material for window | Heat insulating window film sample | Particle shape | Silver flat particle layer | Visible light transmittance % | material Ultraviolet absorber | Substrate Glass thickness mm | Ultraviolet transmittance | Shade factor | Warming properties (before exposure) | Warming properties (after exposure) | Discoloration after exposure |
| Example 501 | 107 | Fibrous metal | Absent | 81 | Contained | 2 | 70% | 0.95 | 8 | 2 | Observed |
| Example 502 | 107 | Fibrous metal | Absent | 81 | Contained | 2 | 5% | 0.93 | 8 | 6 | None |
| Example 503 | 107 | Fibrous metal | Absent | 81 | Contained | 2 | 2% | 0.92 | 7 | 7 | None |
| Example 504 | 107 + silver flat particle layer | Fibrous metal | Present | 79 | Contained | 2 | 70% | 0.85 | 7 | 3 | Observed |
| Example 505 | 107 + silver flat particle layer | Fibrous metal | Present | 79 | Contained | 2 | 5% | 0.83 | 7 | 7 | None |
| Example 506 | 107 + silver flat particle layer | Fibrous metal | Present | 79 | Contained | 2 | 2% | 0.82 | 6 | 6 | None |
| Example 507 | 107 + silver flat particle layer | Fibrous metal | Present | 78 | Contained | 2 | 70% | 0.75 | 5 | 5 | None |

TABLE 3-continued

| | Heat insulating material for window | | | | | | | | | | |
|---|---|---|---|---|---|---|---|---|---|---|---|
| | Heat insulating window film | | | | Pressure sensitive adhesive | | Evaluation of heat insulating material for window | | | | |
| Sample of heat insulating material for window | Heat insulating window film sample | Particle shape | Silver flat particle layer | Visible light transmittance % | material Ultraviolet absorber | Substrate Glass thickness mm | Ultraviolet transmittance | Shade factor | Warming properties (before exposure) | Warming properties (after exposure) | Discoloration after exposure |
| Example 508 | 107 + silver flat particle layer | Fibrous metal | Present | 78 | Contained | 2 | 5% | 0.73 | 5 | 5 | None |
| Example 509 | 107 + silver flat particle layer | Fibrous metal | Present | 78 | Contained | 2 | 2% | 0.72 | 5 | 5 | None |

From Table 3, it was found that the heat insulating material for a window of the invention had high visible light transmittance and high warming properties. Particularly, it was found that, the heat insulating material for a window having a high shade factor had high warming properties, but in a case where the ultraviolet transmittance of warming properties after exposure test is high, a decrease in the warming properties before and after the exposure test was significant. In a case where the ultraviolet transmittance is high due to a small content of the ultraviolet absorber, and the shade factor is high due to absence of silver plated particle layer or a small amount of silver plated particle layer used, a decrease in warming properties after exposure or the yellowing was significant (Example 501 to 504). In a case where the shade factor is high, a decrease in warming properties after exposure test is small, when the ultraviolet transmittance is low, and this is the preferred aspect of the invention.

Example 601

<Preparation of Heat Insulating Material for Window>

A heat insulating window film of Example 601 was obtained in the same manner as in the preparation of the heat insulating window film of Example 107, except for using a silver nanowire dispersion liquid obtained by pure propanol substitution and propylene glycol monomethyl ether acetate substitution at the time of preparing the silver nanowire dispersion liquid 1-A, instead of the silver nanowire dispersion liquid 1-A, and using the following solution A not containing an alkoxide compound of the element (b) selected from the group consisting of Si, Ti, Zr, and Al, instead of the sol-gel solution containing tetraethoxysilane.

(Solution A)
Dipentaerythritol hexaacrylate: 5.0 parts
Photopolymerization initiator: 2,4-bis-(trichloromethyl)-6-[4-[N,N- is (ethoxycarbonylmethyl) amino]-3-bromophenyl]-s-triazine: 0.4 parts
Methyl ethyl ketone: 13.6 parts A heat insulating material for a window of Example 601 was prepared in the same manner as in preparation of the heat insulating material for a window of Example 302, except for using the heat insulating window film of Example 601 instead of the heat insulating window film of Example 107.

<Evaluation>

The evaluation regarding the obtained heat insulating material for a window of Example 601 was performed in the same manner as in Example 302.

As a result thereof, it was found that the heat insulating material for a window of Example 601 also had high visible light transmittance and high warming properties. Here, the effects of the invention were obtained in Example 601, but higher warming properties were obtained when using the heat insulating material for a window of Example 302 using the heat insulating window film of Example 107. Therefore, the heat insulating material for a window of Example 302 is the more preferred aspect of the invention.

Examples 701 to 705

<Preparation and Evaluation of Heat Insulating Window Film>

Heat insulating window film samples 119 to 122 were prepared in the same manner as the case of the heat insulating window film sample 107, except for changing the preparation amount of the liquid additive A of the dispersion liquid preparation method 1-A to the amount shown in Table 4 below.

The average short diameter and the average long diameter of silver nanowires using the samples were acquired by the same method as in Example 301, the long diameter size distribution was measured at this time, the number ratio of particles having a long diameter equal to or greater than 15 µm was acquired, and the results are shown in Table 4 below.

The samples for measurement of optical properties were prepared by using the heat insulating window film samples 107 and 119 to 122 in the same manner as in Example 107. The visible light transmittance of the sample of for measurement of optical properties was measured by the same method as in Example 107. The haze of the sample of for measurement of optical properties was measure based on JIS-K-7105 by using a haze meter (NDH-2000 manufactured by Nippon Denshoku Industries Co., Ltd.). The obtained results are shown in Table 4 below.

<Preparation and Evaluation of Heat Insulating Material for Window>

Heat insulating materials for a window of examples 701 to 705 were prepared by the same method as in Example 301, except for using the heat insulating window film samples 107 and 119 to 122.

The warming properties of the heat insulating materials for a window of examples 701 to 705 were measured by the same method as in Example 301. The obtained results are shown in Table 4 below.

TABLE 4

| Sample of heat insulating material for window | Heat insulating window film sample | Particles | | | | Evaluation | | Evaluative of heat insulating material for window Warming properties |
|---|---|---|---|---|---|---|---|---|
| | | Preparation amount of liquid additive A | Average short diameter nm | Average long diameter μm | Number ratio of particles having long diameter equal to or greater than 15 μm % | Visible light transmittance % | Haze % | |
| Example 701 | 107 | Reference [amount shown in dispersion preparation method 1-A] (100%) | 24 | 10 | 25 | 81 | 1.90% | 7 |
| Example 702 | 119 | 150% | 24 | 9 | 12 | 81 | 1.70% | 8 |
| Example 703 | 120 | 200% | 24 | 8 | 1 | 81 | 1.50% | 8 |
| Example 704 | 121 | 400% | 23 | 7 | 1 | 81 | 1.50% | 7 |
| Example 705 | 122 | 50% | 25 | 12 | 40 | 81 | 2.10% | 7 |

As shown in Table 4, it is found that when the number proportion of the silver nanowires having a long diameter equal to or greater than 15 m is low, the haze is low, and this is preferred aspect.

When the anisotropy of the surface electrical resistance of the fibrous metal particles of the heat insulating window film or the heat insulating material for a window of Examples and Comparative Examples was measured by the method disclosed in this specification, the anisotropy was equal to or smaller than 10% in Examples 701 to 705.

When the chromaticity of the heat insulating materials for a window of Examples and Comparative Examples was measured by the method disclosed in this specification, any one of a* and b* of transmission chromaticity and a* and b* of reflection chromaticity in Examples 702 to 704 was from −1 to 1.

FIELD OF INDUSTRIAL APPLICATION

The heat insulating material for a window of the invention using the heat insulating window film of the invention has excellent visible light transmittance and warming properties, and accordingly, when the heat insulating window film of the invention is disposed on the inner side of the window, it is possible to provide a window having excellent visible light transmittance and warming properties. When the heat insulating window film of the invention is used as a building material, it is possible to provide a building or a vehicle including windows having excellent visible light transmittance and warming properties. The building provided with such windows can allow light on the outdoor side of the window to emit the indoor side and can prevent heat exchange from the indoor side to the outdoor side of the window. Accordingly, the indoor side (the inside of a room or the inside of a car) of a building or a vehicle provided with such windows can be maintained in a desired environment.

Even when the heat insulating window film of the invention is bonded to the inside of a well-known window (for example, window of a building or a vehicle), it is possible to provide a window having excellent visible light transmittance and warming properties.

EXPLANATION OF REFERENCES

10: flexible support
20: fibrous metal particles-containing layer
31: adhesive layer
41: near infrared shielding layer
51: pressure sensitive adhesive material
61: substrate (substrate having thickness equal to or greater than 0.5 mm)
101: adhesive layer-attached flexible support
103: heat insulating window film
111: heat insulating material for window
IN: indoor side
OUT: outdoor side

What is claimed is:
1. A heat insulating window film comprising:
a flexible support; and
a fibrous metal particles-containing layer containing fibrous metal particles,
wherein the fibrous metal particles contain silver or an alloy of silver,
a number proportion of the fibrous metal particles having a long diameter equal to or greater than 15 μm contained in the fibrous metal particles-containing layer is equal to or smaller than 20%,
an average short diameter of the fibrous metal particles is equal to or smaller than 35 nm and an average long diameter is equal to or greater than 5 μm, and
a content per unit area of fibrous metal particles of the fibrous metal particles-containing layer is equal to or greater than 10 mg/m$^2$.
2. The heat insulating window film according to claim 1, wherein the fibrous metal particles-containing layer further contains a sol-gel hardened material obtained by hydrolysis and polycondensation of an alkoxide compound of an element (b) selected from the group consisting of Si, Ti, Zr, and Al.
3. The heat insulating window film according to claim 2, wherein a ratio of a mass of the alkoxide compound used for forming the sol-gel hardened material in the fibrous metal particles-containing layer to a mass of fibrous metal particles contained in the fibrous metal particles-containing layer is from 0.25/1 to 30/1.

4. The heat insulating window film according to claim 1, which is disposed on an indoor side of a window.

5. The heat insulating window film according to claim 4, wherein the fibrous metal particles-containing layer is disposed on the surface of the support on a side opposite to the surface on a window side.

6. The heat insulating window film according to claim 1, wherein visible light transmittance is equal to or greater than 80%.

7. A heat insulating material for a window, wherein the heat insulating window film according to claim 1 and a substrate having a thickness equal to or greater than 0.5 mm are bonded to each other by using a pressure sensitive adhesive material, and wherein a number proportion of the fibrous metal particles having a long diameter equal to or greater than 15 μm contained in the fibrous metal particles-containing layer is equal to or smaller than 20%.

8. The heat insulating material for a window according to claim 7, wherein the pressure sensitive adhesive material contains an ultraviolet absorber.

9. The heat insulating material for a window according to claim 7, wherein the substrate is glass or a resin plate.

10. The heat insulating material for a window according to claim 7, wherein the substrate is a substrate having a thickness equal to or greater than 2 mm.

11. The heat insulating material for a window according to claim 7, wherein a shade factor is equal to or greater than 0.8.

12. The heat insulating material for a window according to claim 7, wherein a number proportion of fibrous metal particles having a long diameter equal to or greater than 15 μm contained in the fibrous metal particles-containing layer is equal to or smaller than 20%.

13. A heat insulating material for a window, comprising:
a substrate having a thickness equal to or greater than 0.5 mm; and
a fibrous metal particles-containing layer containing fibrous metal particles,
wherein the fibrous metal particles contain silver or an alloy of silver,
a number proportion of the fibrous metal particles having a long diameter equal to or greater than 15 μm contained in the fibrous metal particles-containing layer is equal to or smaller than 20%,
an average short diameter of the fibrous metal particles is equal to or smaller than 35 nm and an average long diameter is equal to or greater than 5 μm, and
a content per unit area of fibrous metal particles of the fibrous metal particles-containing layer is equal to or greater than 10 mg/m$^2$.

14. The heat insulating material for a window according to claim 13, wherein the fibrous metal particles-containing layer further contains a sol-gel hardened material obtained by hydrolysis and polycondensation of an alkoxide compound of an element (b) selected from the group consisting of Si, Ti, Zr, and Al.

15. The heat insulating material for a window according to claim 14, wherein a ratio of a mass of the alkoxide compound used for forming the sol-gel hardened material in the fibrous metal particles-containing layer to a mass of fibrous metal particles contained in the fibrous metal particles-containing layer is from 0.25/1 to 30/1.

16. The heat insulating material for a window according to claim 13, wherein the fibrous metal particles-containing layer is disposed on an indoor side of a window.

17. The heat insulating material for a window according to claim 16, wherein the fibrous metal particles-containing layer is disposed on the surface of the substrate on a side opposite to a surface on a window side.

18. A window comprising:
a window glass and a heat insulating window film bonded to the window glass, wherein the heat insulating window film comprises:
a flexible support; and
a fibrous metal particles-containing layer containing fibrous metal particles,
wherein the fibrous metal particles contain silver or an alloy of silver,
a number proportion of the fibrous metal particles having a long diameter equal to or greater than 15 μm contained in the fibrous metal particles-containing layer is equal to or smaller than 20%,
an average short diameter of the fibrous metal particles is equal to or smaller than 35 nm and an average long diameter is equal to or greater than 5 μm, and
a content per unit area of fibrous metal particles of the fibrous metal particles-containing layer is equal to or greater than 10 mg/m$^2$.

* * * * *